United States Patent
Fernald et al.

(10) Patent No.: US 6,668,656 B2
(45) Date of Patent: Dec. 30, 2003

(54) OPTICAL SENSOR HAVING DIFFERING DIAMETERS

(75) Inventors: Mark R. Fernald, Enfield, CT (US); Timothy J. Bailey, Longmeadow, MA (US); Matthew B. Miller, Glastonbury, CT (US); James M. Sullivan, Manchester, CT (US); James R. Dunphy, South Glastonbury, CT (US); Michael A. Davis, Glastonbury, CT (US); Christopher J. Wright, Amston, CT (US); Alan D. Kersey, South Glastonbury, CT (US); Martin A. Putnam, Cheshire, CT (US); Robert N. Brucato, Waterbury, CT (US); Paul E. Sanders, Madison, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 29 days.

(21) Appl. No.: 10/191,710

(22) Filed: Jul. 9, 2002

(65) Prior Publication Data

US 2002/0194917 A1 Dec. 26, 2002

Related U.S. Application Data

(63) Continuation of application No. 09/455,867, filed on Dec. 6, 1999, now Pat. No. 6,422,084, which is a continuation-in-part of application No. 09/399,404, filed on Sep. 20, 1999, now abandoned, which is a continuation-in-part of application No. 09/205,944, filed on Dec. 4, 1998, now abandoned.

(51) Int. Cl.$^7$ .................................................. G01L 9/00

(52) U.S. Cl. ........................................................ 73/705

(58) Field of Search ...................... 23/705, 708, 729.1, 23/152.22, 152.27, 152.51, 800; 250/227.14, 227.18, 227.21, 231.19; 356/32, 34, 345, 349, 350, 352

(56) References Cited

U.S. PATENT DOCUMENTS

| | | | |
|---|---|---|---|
| 3,625,062 A | 12/1971 | Heske | 73/398 |
| 4,509,370 A | 4/1985 | Hirschfeld | 73/705 |
| 4,636,031 A | 1/1987 | Schmadel, Jr. et al. | 350/96.19 |
| 4,704,151 A | 11/1987 | Keck | 65/4.1 |

(List continued on next page.)

FOREIGN PATENT DOCUMENTS

| | | |
|---|---|---|
| DE | 19724528 | 12/1998 |
| EP | 0162303 | 12/1991 |

(List continued on next page.)

OTHER PUBLICATIONS

M.G. Xu, Gieger & J.P. Dakin, "Fibre Grating Pressure Sensor With Enhanced Sensitivity Using A Glass/Bubble Housing," Elec. Letters, Jan. 18, 1996, vol. 32 No. 2.

Quatrzdyne, Inc., Series QU/QG Spec Specification Sheet p. 6, Section 1, General Information Taken From Quartzdyne Pressure Transducers General Catalogue and Operating Manual For Quartzdyne Downhole High Pressure Transducers (Series Qu,QG, QL, TMC, 1XP & LP), Apr. 1, 1997.

(List continued on next page.)

*Primary Examiner*—William Oen
(74) *Attorney, Agent, or Firm*—Moser, Patterson & Sheridan, L.L.P.

(57) ABSTRACT

A fiber Bragg grating based sensor is disclosed. The sensor comprises an optical waveguide having a core and a cladding. The core comprises a pressure sensor such as a fiber Bragg grating. In one embodiment, a support is affixed around the cladding which has two first portions each having a first diameter. The pressure sensor is located at a second portion of the support positioned between the two first portions which has a second smaller diameter, thus giving the sensor a "dog bone" shape. In another embodiment, the dog bone shape is imparted by positioning the pressure sensor at a portion of a waveguide having a reduced cladding diameter.

37 Claims, 11 Drawing Sheets

U.S. PATENT DOCUMENTS

| | | | |
|---|---|---|---|
| 4,727,730 A | 3/1988 | Boiarski et al. | 128/667 |
| 4,915,467 A | 4/1990 | Berkey | 350/96.15 |
| 4,932,263 A | 6/1990 | Wlodarczyk | 73/705 |
| 4,944,187 A | 7/1990 | Frick et al. | 73/733 |
| 4,948,217 A | 8/1990 | Keck et al. | 350/96.15 |
| 5,007,705 A | 4/1991 | Morey et al. | 350/96.29 |
| 5,042,898 A | 8/1991 | Morey et al. | 385/37 |
| 5,136,677 A | 8/1992 | Drexhage et al. | 385/123 |
| 5,187,983 A | 2/1993 | Bock et al. | 73/705 |
| 5,202,939 A | 4/1993 | Belleville et al. | 385/12 |
| 5,235,659 A | 8/1993 | Atkins et al. | 385/124 |
| 5,367,589 A | 11/1994 | MacDonald et al. | 385/37 |
| 5,392,117 A | 2/1995 | Belleville et al. | 356/352 |
| 5,399,854 A | 3/1995 | Dunphy et al. | 250/227.17 |
| 5,469,520 A | 11/1995 | Morey et al. | 385/37 |
| 5,511,083 A | 4/1996 | D'Amato et al. | 372/6 |
| 5,512,078 A | 4/1996 | Griffin | 65/484 |
| 5,519,803 A | 5/1996 | Shiono et al. | 385/132 |
| 5,578,106 A | 11/1996 | Fleming, Jr. et al. | 65/391 |
| 5,612,778 A | 3/1997 | Hall et al. | 356/4.09 |
| 5,682,453 A | 10/1997 | Daniel et al. | 385/99 |
| 5,684,297 A | 11/1997 | Tardy | 250/227.14 |
| 5,691,999 A | 11/1997 | Ball et al. | 373/20 |
| 5,745,626 A | 4/1998 | Duck et al. | 385/96 |
| 5,767,411 A | 6/1998 | Maron | 73/705 |
| 5,771,251 A | 6/1998 | Kringlebotn et al. | 372/6 |
| 5,841,131 A | 11/1998 | Schroeder et al. | 250/227.17 |
| 5,844,927 A | 12/1998 | Kringlebotn | 372/6 |
| 5,877,426 A | 3/1999 | Hay et al. | 73/733 |
| 6,018,534 A | 1/2000 | Pan et al. | 372/6 |
| 6,131,465 A | 10/2000 | Wlodarczyk et al. | 73/715 |
| 6,304,686 B1 | 10/2001 | Yamate et al. | 385/13 |
| 6,445,868 B1 * | 9/2002 | Grunbeck et al. | 385/138 |
| 6,452,667 B1 * | 9/2002 | Fernald et al. | 356/73.1 |
| 6,490,931 B1 * | 12/2002 | Fernald et al. | 73/705 |

FOREIGN PATENT DOCUMENTS

| | | | |
|---|---|---|---|
| EP | 0359351 | 9/1992 | C03B/37/15 |
| EP | 0302745 | 3/1994 | |
| EP | 0409447 | 11/1996 | |
| GB | 2299203 | 9/1996 | |
| NO | 305004 | 6/1997 | G01L/11/02 |
| WO | WO8204328 | 12/1982 | |
| WO | WO9530926 | 11/1995 | |
| WO | WO9932911 | 3/1998 | G02B/6/16 |
| WO | WO9944026 | 2/1999 | G01L/9/00 |

OTHER PUBLICATIONS

"The Thickness/Shear Quartz Resonantor: A Rugged Precision Pressure Transducer," Product Feature From Sensors, Jul. 1990.

"Design of DFB Fibre Lasers," V.C. Lauridsen et al., Electron Letters, vol. 34, No. 21, pp. 2028–2030, 1998. No mo.

"Erbium Doped Fiber DFB Laser With Permanent $\pi/2$ phase–shift Induced by UV Post–Processing," P. Varming et al., IOOC '95, Tech. Digest, vol. 5, PD1–3, 1995 No mo.

* cited by examiner

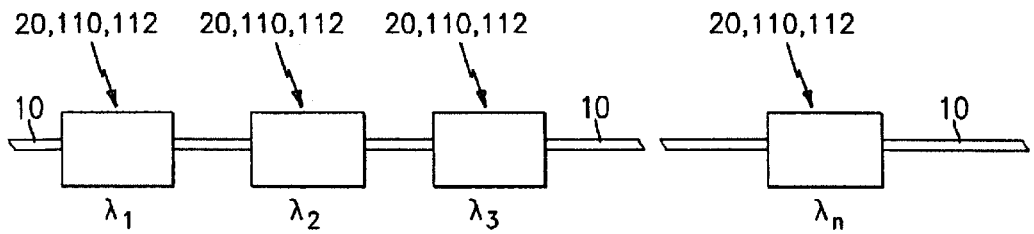
FIG. 21
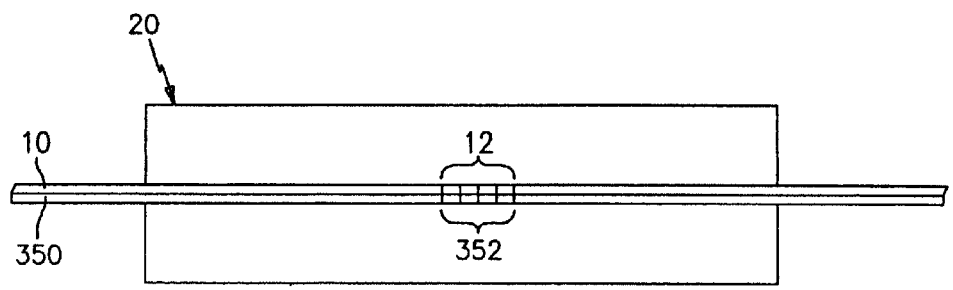
FIG. 22
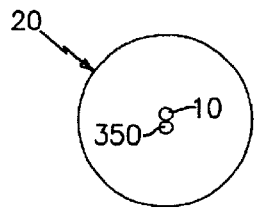 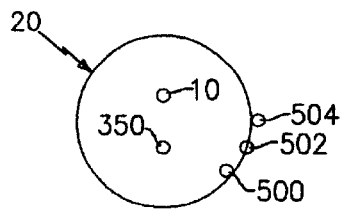
FIG. 23   FIG. 24
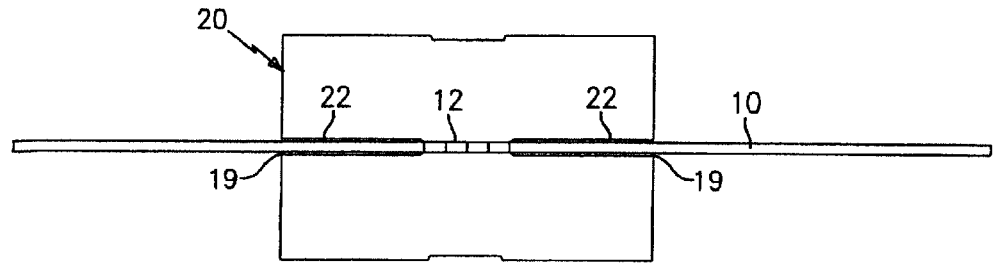
FIG. 25

OPTICAL SENSOR HAVING DIFFERING DIAMETERS

CROSS REFERENCES TO RELATED APPLICATIONS

This is a continuation of U.S. patent application Ser. No. 09/455,867, filed Dec. 6, 1999 now U.S. Pat. No. 6,422,084, which is a continuation-in-part of U.S. patent application Ser. No. 09/399,404, filed Sep. 20, 1999 now abandoned, which is a continuation-in-part of U.S. patent application Ser. No. 09/205,944, filed Dec. 4, 1998 now abandoned. Priority is claimed to these earlier applications.

U.S. patent applications Ser. No. 09/455,865, entitled "Tube-Encased Fiber Grating," Ser. No. 09/455,866, entitled "Strain-Isolated Bragg Grating Temperature Sensor," Ser. No. 09/456,112 (now U.S. Pat. No. 6,229,827), entitled "Compression-Tuned Bragg Grating and Laser," Ser. No. 09/456,113, entitled "Pressure Isolated Bragg Grating Temperature Sensor," Ser. No. 09/399,504, entitled "Fiber Optic Bragg Grating Pressure Sensor," Ser. No. 09/455,868, entitled "Large Diameter Optical Waveguide, Grating, and Laser," and Ser. No. 09/205,845, entitled "Method and Apparatus For Forming A Tube-Encased Bragg Grating," all contain subject matter related to that disclosed herein.

TECHNICAL FIELD

This invention relates to fiber optic pressure sensors, and more particularly to a Bragg grating pressure sensor.

BACKGROUND ART

Sensors for the measurement of various physical parameters such as pressure and temperature often rely on the transmission of strain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors which measure static or very slowly changing parameters, the long term stability of the attachment to the structure is extremely important. A major source of such long term sensor instability is a phenomenon known as "creep", i.e., change in strain on the sensing element with no change in applied load on the elastic structure, which results in a DC shift or drift error in the sensor signal.

Certain types of fiber optic sensors for measuring static and/or quasi-static parameters require a highly stable, very low creep attachment of the optical fiber to the elastic structure. Various techniques exist for attaching the fiber to the structure to minimize creep, such as adhesives, bonds, epoxy, cements and/or solders. However, such attachment techniques may exhibit creep and/or hysteresis over time and/or high temperatures.

One example of a fiber optic based sensor is that described in U.S. patent application Ser. No. 08/925,598 (now U.S. Pat. No. 6,016,702), entitled "High Sensitivity Fiber Optic Pressure Sensor for Use in Harsh Environments," to Robert J. Maron, which is incorporated herein by reference in its entirety. In that case, an optical fiber is attached to a compressible bellows at one location along the fiber, and to a rigid structure at a second location along the fiber. A Bragg grating is embedded within the fiber between these two attachment locations with the grating being in tension. As the bellows is compressed due to an external pressure change, the tension on the fiber grating is reduced, which changes the wavelength of light reflected by the grating. If the attachment of the fiber to the structure is not stable, the fiber may move (or creep) relative to the structure it is attached to, and the aforementioned measurement inaccuracies occur.

In another example, an optical fiber Bragg grating pressure sensor where the fiber is secured in tension to a glass bubble by a UV cement is discussed in Xu, M. G., Beiger, H., Dakein, J. P., "Fibre Grating Pressure Sensor With Enhanced Sensitivity Using A Glass-Bubble Housing," Electronics Letters, 1996, Vol. 32, pp. 128–129.

However, as discussed hereinbefore, such attachment techniques may exhibit creep and/or hysteresis over time and/or high temperatures, or may be difficult or costly to manufacture.

SUMMARY OF THE INVENTION

Objects of the present invention include provision of a fiber optic pressure sensor with minimal creep.

According to the present invention, a pressure sensor comprises an optical sensing element, having at least one pressure reflective element disposed therein along a longitudinal axis of the sensing element, the pressure reflective element having a pressure reflection wavelength; the sensing element being axially strained due to a change in external pressure, the axial strain causing a change in the pressure reflection wavelength, and the change in the pressure reflection wavelength being indicative of the change in pressure; and at least a portion of the sensing element having a transverse cross-section which is contiguous and made of substantially the same material and having an outer transverse dimension of at least 0.3 mm.

According further to the present invention, the sensing element comprises: an optical fiber, having the reflective element embedded therein; and a tube, having the optical fiber and the reflective element encased therein along a longitudinal axis of the tube, the tube being fused to at least a portion of the fiber. According further to the present invention, the sensing element comprises a large diameter optical waveguide having an outer cladding and an inner core disposed therein and an outer waveguide dimension of at least 0.3 mm.

According still further to the present invention, the reflective element is a Bragg grating. According still further to the present invention, the sensing element has a dogbone shape. According still further to the present invention, the sensing element comprises a dogbone shape and comprises an outer tube fused to at least a portion of large sections of the dogbone shape on opposite axial sides of the reflective element.

The present invention provides a fiber grating disposed in an optical sensing element which includes an optical fiber fused to at least a portion of a glass capillary tube ("tube encased fiber/grating") and/or a large diameter waveguide grating having an optical core and a wide cladding, which is elastically deformable based on applied pressure. The invention substantially eliminates creep and other optical fiber attachment problems. The sensing element may be made of a glass material, such as silica or other glasses. Also, the invention provides sensing with very low hysteresis. The present invention allows forces to be applied axially against the sensor element end-faces thereby allowing for high sensor sensitivity. The present invention also provides improved sensor reliability when used in compression. Also, one or more gratings, fiber lasers, or a plurality of fibers may be disposed in the element.

The grating(s) or laser(s) may be "encased" in the tube by having the tube fused to the fiber on the grating area and/or on opposite axial sides of the grating area adjacent to or a predetermined distance from the grating. The grating(s) or laser(s) may be fused within the tube or partially within or to the outer surface of the tube. Also, one or more waveguides and/or the tube encased fiber/gratings may be axially fused to form the sensing element.

Further, the invention may be used as an individual (single point) sensor or as a plurality of distributed multiplexed (multi-point) sensors. Also, the invention may be a feed-through design or a non-feed-through design. The sensor element may have alternative geometries, e.g., a dogbone shape, that provides enhanced force to wavelength shift sensitivity and is easily scalable for the desired sensitivity.

The invention may be used in harsh environments (high temperature and/or pressure), such as in oil and/or gas wells, engines, combustion chambers, etc. For example, the invention may be an all glass sensor capable of operating at high pressures (>15 kpsi) and high temperatures (>150° C.). The invention will also work equally well in other applications independent of the type of environment.

The foregoing and other objects, features, and advantages of the present invention will become more apparent in light of the following detailed description of exemplary embodiments thereof.

BRIEF DESCRIPTION OF THE DRAWINGS

FIG. 21 is a block diagram of a plurality of tube-encased fiber grating sensors connected in series, in accordance with the present invention.

FIG. 22 is a side view of a tube-encased fiber grating sensor having two separate optical fibers encased in a common tube, in accordance with the present invention.

FIG. 23 is an end view of the embodiment of FIG. 21, in accordance with the present invention.

FIG. 24 is an end view of a tube-encased fiber grating sensor having two separate optical fibers encased in a common tube, in accordance with the present invention.

FIG. 25 is a side view of a tube-encased fiber grating where the tube is collapsed on the fiber only over the length of the grating, in accordance with the present invention.

DETAILED DESCRIPTION OF THE PREFERRED EMBODIMENTS

Figure 1:
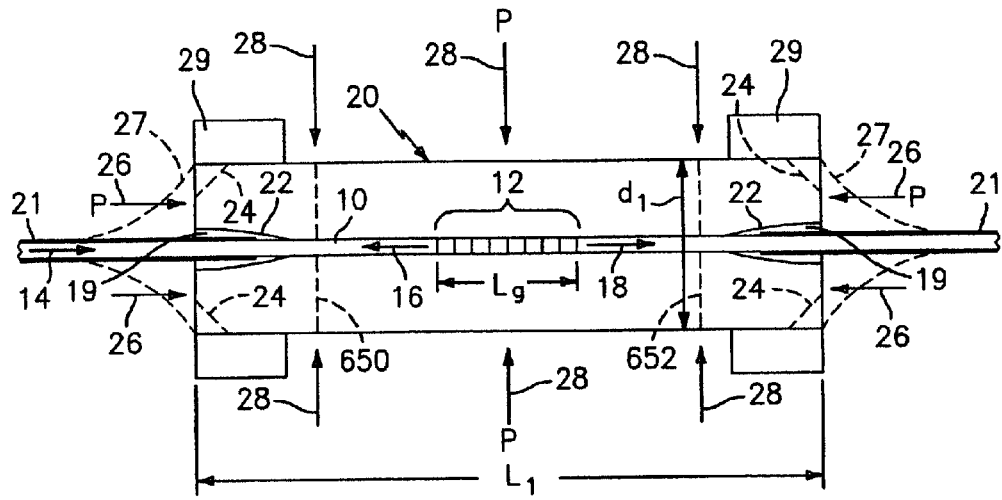
FIG. 1 is a side view of a tube-encased fiber grating sensor, in accordance with the present invention.

Referring to FIG. 1, a fiber Bragg grating pressure sensor comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to allow light 14 to propagate along the fiber 10. The Bragg grating 12, as is known, is a periodic or aperiodic variation in the effective refractive index and/or effective optical absorption coefficient of an optical waveguide, similar to that described in U.S. Pat. Nos. 4,725,110 and 4,807,950, entitled "Method for Impressing Gratings Within Fiber Optics," to Glenn et al; and U.S. Pat. No. 5,388,173, entitled "Method and Apparatus for Forming Aperiodic Gratings in Optical Fibers," to Glenn, which are hereby incorporated by reference to the extent necessary to understand the present invention. However, any wavelength-tunable grating or reflective element embedded, etched, imprinted, or otherwise formed in the fiber 10 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, silica, phosphate glass, or other glasses, or made of glass and plastic, or plastic, or other materials used for making optical fibers. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above described waveguides.

The light 14 is incident on the grating 12, which reflects a portion thereof as indicated by a line 16 having a predetermined wavelength band of light centered at a reflection wavelength λ1, and passes the remaining wavelengths of the incident light 14 (within a predetermined wavelength range), as indicated by a line 18. The fiber 10 with the grating 12 therein is encased in and fused to at least a portion of an elastically deformnable pressure sensing element 20, such as a cylindrical glass capillary tube, referred to hereinafter as a tube. The tube 20 may have an outer diameter d1 of about 2 mm and a length L1 of about 12 mm. The grating 12 has a length Lg of about 5 mm. Alternatively, the length L1 of the tube 20 may be substantially the same length as the length Lg of the grating 12, such as by the use of a longer grating, or a shorter tube. Other dimensions and lengths for the tube 20 and the grating 12 may be used. Also, the fiber 10 and grating 12 need not be fused in the center of the tube 20 but may be fused anywhere in the tube 20. Also, the tube 20 need not be fused to the fiber 10 over the entire length L1 of the tube 20.

The tube 20 is made of a glass material, such as natural or synthetic quartz, fused silica, silica ($SiO_2$), Pyrex® by Corning (boro silicate), or Vycor® by Corning (about 95% silica and 5% other constituents such as Boron Oxide), or other glasses. The tube 20 should be made of a material such that the tube 20 (or the inner diameter surface of a bore hole in the tube 20) can be fused to (i.e., create a molecular bond with, or melt together with) the outer surface (or cladding) of the optical fiber 10 such that the interface surface between the inner diameter of the tube 20 and the outer diameter of the fiber 10 become substantially eliminated (i.e., the inner diameter of the tube 20 cannot be distinguished from and becomes part of the cladding of the fiber 10).

For best thermal expansion matching of the tube 20 to the fiber 10 over a large temperature range, the coefficient of thermal expansion (CTE) of the material of the tube 20 should substantially match the CTE of the material of the fiber 10. In general, the lower the melting temperature of the glass material, the higher the CTE, e.g., a fused silica tube and optical fiber. Thus, a silica fiber having a high melting temperature and low CTE and a tube made of another glass material, such as Pyrex® or Vycor® having a lower melting temperature and higher CTE, results in a thermal expansion mismatch between the tube 20 and the fiber 10 over temperature. However, it is not required for the present invention that the CTE of the fiber 10 match the CTE of the tube 20 (discussed more hereinafter).

Instead of the tube 20 being made of a glass material, other elastically deformable materials may be used, provided the tube 20 can be fused to the fiber 10. For example, for an optical fiber made of plastic, a tube made of a plastic material may be used.

The axial ends of the tube 20 where the fiber 10 exits the tube 20 may have an inner region 22 which is inwardly tapered (or flared) away from the fiber 10 to provide strain relief for the fiber 10 or for other reasons. In that case, an area 19 between the tube 20 and the fiber 10 may be filled with a strain relief filler material e.g., polyimide, silicone, or other materials. Also, the tube 20 may have tapered (or beveled or angled) outer corners or edges 24 to provide a seat for the tube 20 to mate with another part (discussed hereinafter) and/or to adjust the force angles on the tube 20, or for other reasons. The angle of the beveled corners 24 is set to achieve the desired function. The tube 20 may have side cross-sectional shapes other than circular, such as square, rectangular, elliptical, clam-shell, or other shapes, and may have side-view (or transverse) cross-sectional shapes other than rectangular, such as circular, square, elliptical, clam-shell, or other shapes.

Also, outer rings or sleeves 29 may be located around the outer diameter of the inner tapered region 22 of the tube 20 to help prevent cracking of the fiber 10 at the junction of the tube 20 and the fiber 10. This cracking is due to the Poisson effect (discussed hereinafter) or other force effects and occurs when axial force is applied to the tube 20. The sleeves 29 are made of a stiff, hard material, such as a metal.

Alternatively, instead of having the inner tapered region 22, the axial ends of the tube where the fiber 10 exits the tube 20 may have an outer tapered (or fluted, conical, or nipple) section, shown as dashed lines 27, which has an outer geometry that decreases down to the fiber 10 (discussed more hereinafter with respect to FIG. 12). In that case, the rings 29 may not be needed. It has been determined that using the fluted sections 27 provides enhanced pull strength at and near the interface between the fiber 10 and the tube 20, e.g., 6 lbf or more, when the fiber 10 is pulled along its longitudinal axis.

Where the fiber 10 exits the tube 20, the fiber 10 may have an external protective buffer layer 21 to protect the outer surface of the fiber 10 from damage. The buffer 21 may be made of polyimide, silicone, Teflon® (polytetrafluoroethylene), carbon, gold, and/or nickel, and has a thickness of about 25 microns. Other thicknesses and buffer materials for the buffer layer 21 may be used. If the inner tapered axial region 22 is used and is large enough, the buffer layer 21 may be inserted into the region 22 to provide a transition from the bare fiber to a buffered fiber. Alternatively, if the region has the external taper 27, the buffer 21 would begin where the fiber exits the tube 20. If the buffer 21 starts after the fiber exit point, the fiber 10 may be recoated with an additional buffer layer (not shown) which covers any bare fiber outside of the fused region and overlaps with the buffer 21 and may also overlap some of the region 27 or the end of the tube 20.

The glass-encased fiber grating may be used by itself or as a component in a larger configuration to measure pressure. For example, the glass-encased grating tube of the embodiment shown in FIG. 1 may be used by itself directly as a pressure sensor (also discussed hereinafter with FIGS. 9, 10). In that case, the diameter, length, and material of the tube 20 determine whether the grating 12 reflection wavelength λ1 will shift up or down and determine the amount of the wavelength shift. Also, material properties of the tube 20 such as Poisson's ratio (the relationship between the change in length to the change in diameter of the rod, due to an external force) and the Young's Modulus (i.e., the axial compressibility of the rod as a function of rod length) help to determine the wavelength shift.

In particular, if the tube 20 is placed in an environment with a pressure P, there will be axial pressure forces 26 and radial pressure forces 28. The pressure P may be fluid pressure (where a fluid is a liquid or a gas or a combination thereof). Depending on Poisson's ratio and Young's modulus (or axial compressibility) and other material properties of the tube 20, the tube 20 may compress or elongate axially as the pressure increases. For the tube 20 made of glass or metal materials (and other materials with low Poisson's ratios), as pressure increases, L1 will decrease, i.e., axially compress (independent of length L1 and diameter d1 of the tube 20), for a uniform axial pressure field around the tube 20, which causes the grating 12 reflection wavelength λ1 to decrease. Conversely, if axial pressure 26 is a predetermined amount lower than the radial pressure 28, the tube 20 may axially stretch or elongate, causing L1 to increase, which causes the grating 12 reflection wavelength λ1 to increase. The amount of axial length change for a give pressure P (or force per unit area) is also determined by the axial compressibility of the tube 20. In particular, the more axially compressible the material of the tube 20, the more the length L1 of the tube 20 will change for a given initial length (ΔL1/L1). Also, as temperature changes, the length of the tube 20 changes based on a known coefficient of thermal expansion (CTE or $\alpha_L$).

Typical approximate values of Poisson's ratio, Young's Modulus and the Coefficient of Thermal Expansion (CTE) for certain glass materials for the tube 20 are provided in Table 1 below.

TABLE 1

| Material | Poisson's ratio | Young's Modulus | CTE |
| --- | --- | --- | --- |
| Natural Quartz | 0.16 | $10.5 \times 10^6$ psi | $5.5 \times 10^{-7}/°$ C. |
| Synthetic Quartz (Silica; Silicone Dioxide; SiO$_2$) | 0.16 | $10.5 \times 10^6$ psi | $5.5 \times 10^{-7}/°$ C. |
| Fused Silica | 0.16 | $10.5 \times 10^6$ psi | $5.5 \times 10^{-7}/°$ C. |
| Pyrex ® | 0.2 | $9.1 \times 10^6$ psi | $32.5 \times 10^{-7}/°$ C. |
| Vycor ® | 0.19 | $9.8 \times 10^6$ psi | $7.5 \times 10^{-7}/°$ C. |

The grating 12 may be impressed in the fiber 10 before or after the capillary tube 20 is encased around the fiber 10 and grating 12. If the grating 12 is impressed in the fiber 10 after the tube 20 is encased around the grating 12, the grating 12 may be written through the tube 20 into the fiber 10 as is described in copending U.S. Pat. No. 6,298,184, entitled "Method and Apparatus For Forming A Tube-Encased Bragg Grating," filed Dec. 4, 1998.

To encase the fiber 10 within the tube 20, the tube 20 may be heated, collapsed, and fused to the grating 12 by a laser, filament, flame, etc., as is described in copending U.S. patent application Ser. No. 09/455,865, entitled "Tube-Encased Fiber Grating," filed contemporaneously herewith, which is incorporated herein by reference. Other techniques may be used for fusing the tube 20 to the fiber 10, such as is discussed in U.S. Pat. No. 5,745,626, entitled "Method For And Encapsulation Of An Optical Fiber," to Duck et al., and/or U.S. Pat. No. 4,915,467, entitled "Method of Making Fiber Coupler Having Integral Precision Connection Wells," to Berkey, which are incorporated herein by reference to the extent necessary to understand the present invention, or other techniques. Alternatively, other techniques may be used to fuse the fiber 10 to the tube 20, such as using a high temperature glass solder, e.g., a silica solder (powder or solid), such that the fiber 10, the tube 20 and the solder become fused to each other, or using laser welding/fusing or other fusing techniques. Also, the fiber may be fused within the tube or partially within or on the outer surface of the tube (discussed hereinafter with respect to FIG. 24).

For any of the embodiments described herein, the grating 12 may be encased in the tube 20 having an initial pre-strain on the grating (compression or tension) or no pre-strain. For example, if Pyrex® or another glass that has a larger coefficient of thermal expansion than that of the fiber 10 is used for the tube 20, when the tube 20 is heated and fused to the fiber and then cooled, the grating 12 is put in compression by the tube 20. Alternatively, the fiber grating 12 may be encased in the tube 20 in tension by putting the grating in tension during the tube heating and fusing process. In that case when the tube 20 is compressed, the tension on the grating 12 is reduced. Also, the fiber grating 12 may be encased in the tube 20 resulting in neither tension nor compression on the grating 12 when no external forces are applied to the tube 20.

The fluted sections 27 where the fiber 10 attaches to the tube 20 may be formed in various ways, such as is described in the aforementioned copending U.S. patent application Ser. No. 09/455,865. For example, the tube 20 may be heated and the tube 20 and/or the fiber 10 pulled on an end to form the fluted sections 27. Alternatively, the fluted ends 27 may be formed using other glass formation techniques, such as etching, polishing, grinding, etc. Other techniques may be used to form the sections 27.

Also, the inner region 22 may be created by numerous techniques, such as is described in the aforementioned copending U.S. patent application Ser. No. 09/455,865. For example, not collapsing the tube 20 to the fiber 10 in the regions 22 or to create a region 22 that is larger than the inner diameter of the tube 20, the tube 20 may be heated in the desired region to be expanded and internal pressure applied to the tube 20.

Figure 2:
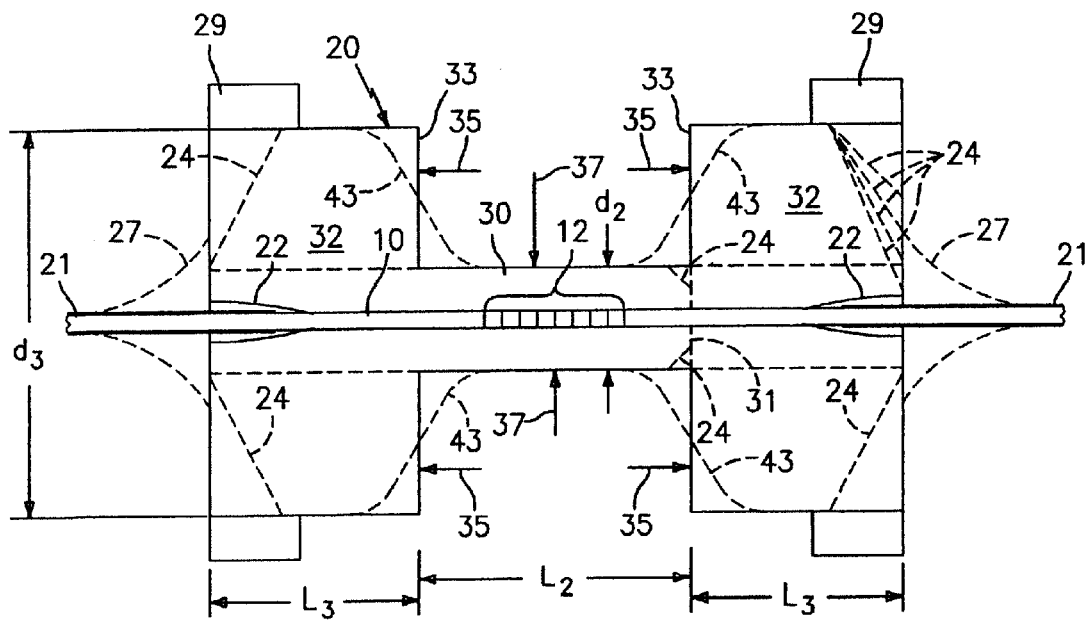
FIG. 2 is a side view of an alternative embodiment of a tube-encased fiber grating sensor, in accordance with the present invention.

Referring to FIG. 2, in an alternative embodiment, it has been determined that increased sensitivity can be realized by varying the geometry of the capillary tube 20. In particular, the tube 20 may have a "dogbone" shape having a narrow central section 30 and larger outer sections 32 (or pistons). The narrow section 30 has an outer diameter d2 of about 2 mm, and a length L2 of about 9.25 mm. The large sections 32 have an outer diameter d3 of about 4 mm and a length L3 of about 6.35 mm. Other lengths L2, L3 of the sections 30, 32 may be used, as long as buckling is avoided. For example, the length L3 may be much more than 6.36 mm (e.g., greater than 25.4 mm long) or may be much less than 6.36 mm long. The ratio of the cross-sectional areas ($\pi d^2$)-of the axial end faces of the tube 20 and the narrow portion 30 provides a force/area gain of 4.

Also, the sections 32 of the tube 20 may have the inner tapered regions 22 or the outer tapered sections 27 at the ends of the tube 20, as discussed hereinbefore. Further, the sections 32 may have the tapered (or beveled) outer corners 24 as discussed hereinbefore. An inner transition region 33 of the large sections 32 may be a sharp vertical or angled edge or may be curved as indicated by dashed lines 43. A curved geometry 43 has less stress risers than a sharp edge or corner and thus reduces the likelihood of breakage.

Also, it is not required that the dogbone geometry be symmetric, e.g., the lengths L3 of the two sections 32 may be different if desired. Alternatively, the dogbone may be a single-sided dogbone, where instead of the having the two larger sections 32, there may be only the large section 32 on one side of the narrow section 30 and the other side may have a straight edge 31 which may have beveled corners 24 as discussed hereinbefore. In that case, the dogbone has the shape of a "T" on its side. Such a single-sided dogbone shall also be referred to herein as a "dogbone" shape. Instead of a dogbone geometry, other geometries that provide enhanced strain sensitivity or adjust force angles on the tube 20 or provide other desirable characteristics may be used.

It has been determined that such a dimension change between the dimension d3 of the large section 32 and the dimension d2 of the narrow section 30 provides increased force to grating wavelength shift sensitivity (or gain or scale factor) by strain amplification. Also, the dimensions provided herein for the dogbone are easily scalable to provide the desired amount of sensitivity. Other geometries which enhance sensitivity or adjust force angles on the tube may be used if desired.

The increased sensitivity of the dogbone geometry is provided by strain amplification caused by the difference between the dimensions d3 and d2. To optimize the sensitivity of the dogbone geometry the larger sections 32 should be isolated from opposing axial forces 35 on the inner transition region 33 and the narrow section 30 should be isolated from radial forces 37. This may be accomplished by surrounding the dogbone with a cylinder, membrane, walls, or other interface, as discussed hereinafter. Radial forces on the narrow section 30 subtract from shifts caused by axial forces due to the Poisson effect, thereby causing decreased sensitivity of the sensor.

The dogbone geometry may be formed by etching, grinding, or polishing the central section of the capillary tube 20 to obtain the narrow diameter d2. Chemical etching (e.g., with hydrofluoric acid or other chemical etches), laser etching, or laser enhanced chemical etching are some techniques which can be used to reduce the outer diameter without applying direct contact force as is required by grinding and polishing. Other techniques may be used to obtain the narrow diameter region 30. After the dogbone (or other geometry) is formed in the tube 20, the surface of the tube 20 may be fire polished to remove surface impurities, enhance strength, or for other reasons.

Figure 3:
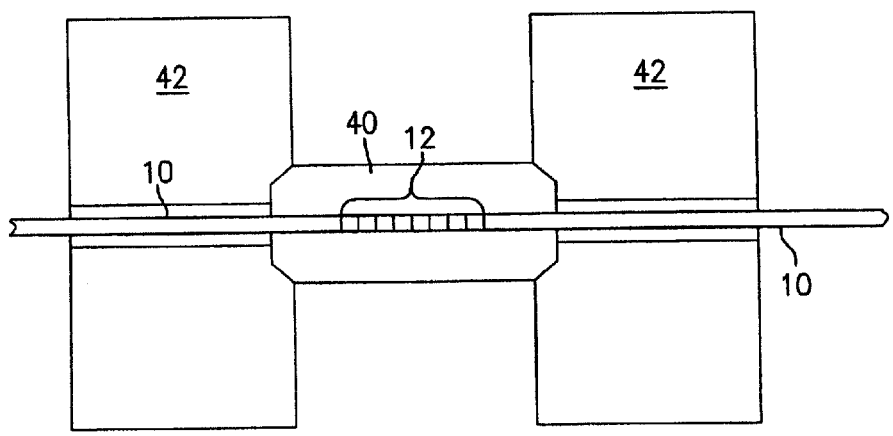
FIG. 3 is a side view of an alternative embodiment of a tube-encased fiber grating sensor, in accordance with the present invention.

Referring to FIG. 3, alternatively, the dogbone geometry may be formed using multiple pieces such as a center piece 40, similar to the glass-encased grating 20 of FIG. 1, surrounded by two end pieces 42 (analogous to the large sections 32 in FIG. 2). The end pieces 42 may be slid onto the fiber 10 and pressed against the center piece 40. The center piece 40 may be seated or recessed within the two end pieces 42 (as shown in FIG. 3) or lay flat against the end pieces 42.

Figure 4:
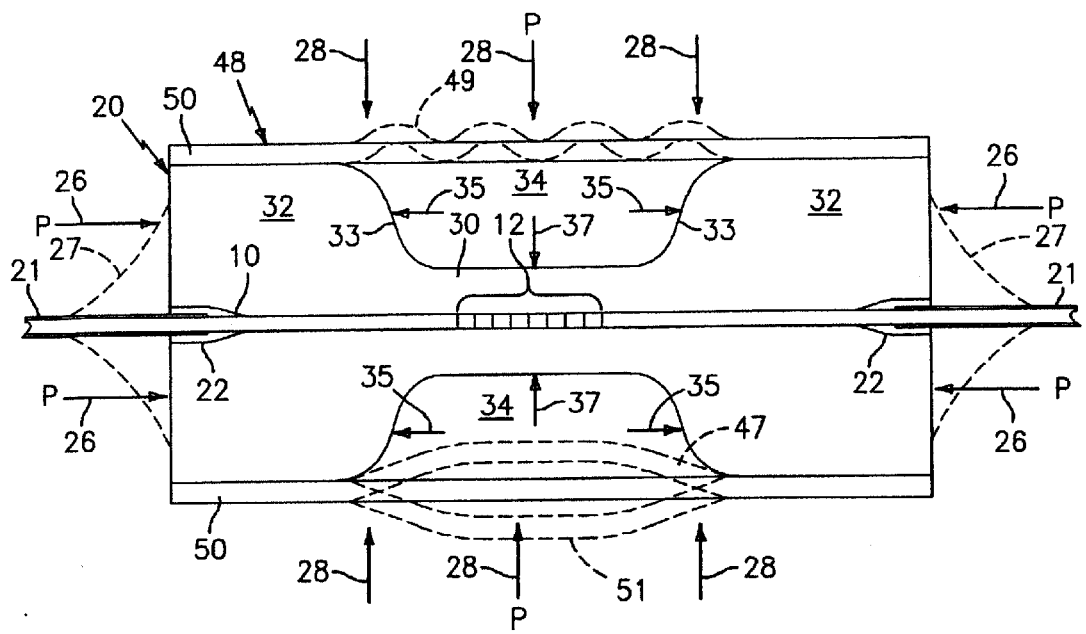
FIG. 4 is a side view of an alternative embodiment of a tube-encased fiber grating sensor, in accordance with the present invention.

Referring to FIG. 4, one way to use the dogbone geometry as a sensor 48 is to surround the dogbone by an outer cylinder or outer tube 50. The cylinder 50 prevents the pressure P from exerting direct radial forces 37 on the middle narrow section 30 and from exerting opposing axial forces 35 on the large sections 32. The cylinder 50 material and properties may exert other forces (axial and/or radial) on the device which should be evaluated and selected for the desired application. The cylinder 50 may be made of the same material as that of the sections 32, e.g., a glass, or of another material, e.g., a metal. If the section 32 and the cylinder 50 are both made of a glass material, the cylinder 50 may be fused to the sections 32, similar to the way the tube 20 is fused to the fiber 10. Alternatively, the cylinder 50 may be attached to the outer dimensions of the larger sections 32 of the tube 20 by soldering, welding, melting, adhesives, or epoxies, or by other suitable attachment techniques. The cylinder 50 forms a hermetically sealed chamber (or cavity) 34 between the cylinder 50 and the narrow section 30 of the tube 20. When pressure P is applied, as indicated by the lines 26, the radial pressure 28 causes the cylinder 50 to deflect radially into the chamber 34, and the axial pressure 26 acting on the exterior axial end faces of the sections 32 and the cylinder 50 causes the sections 30, 32 and the cylinder 50 to axially compress. The amount of axial compression and radial deflection of the parts 30, 32, 50 will depend on their material properties and dimensions. Also, the dogbone-shaped tube 20 may be formed by one or more pieces as discussed.

Alternatively, the geometry of the outer cylinder 50 may be other than a straight cylinder, and may have a geometry that changes the compliance or elasticity of the outer cylinder 50. For example, the outer cylinder 50 may have a corrugated (or bellows) shape, as indicated by dashed lines 49, or a pre-established inward or outward curvature as indicated by dashed lines 47 or 51, respectively, or other geometries. The bellows shape allows the axial compliance to increase while not reducing the maximum radial break strength pressure of the cylinder.

Figure 26:
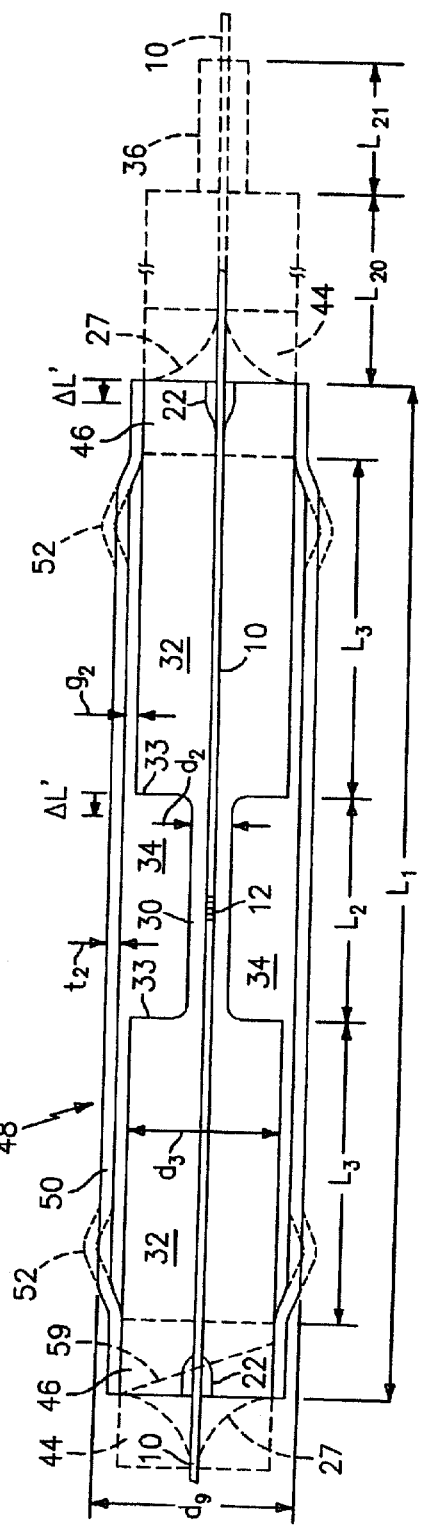
FIG. 26 is a side view of an alternative embodiment of a tube-encased fiber grating sensor, in accordance with the present invention.

Referring to FIG. 26, alternatively, the outer tube 50 may be fused to the tube 20 away from the inner transition region 33 and/or near the axial ends 46 of the tube 20. In that case, there would be a gap g2 of about 0.5 mm between the inner diameter of the cylinder 50 and the outer diameter of the large sections 32 (or pistons) of the dogbone. Also, the thickness T2 of the outer tube 50 is about 0.5 mm. Further, the length L2 of the short portion 30 of the dogbone is about 7.0 mm, and the length between where the tube 50 is fused to the pistons 32 (2*L3+L2) is about 3.56 cm and the diameters d2, d3 of the sections 30, 32 are about 1.0 mm and 3.0 mm, respectively. For these dimensions, and if made of a glass material (fused silica and natural quartz), the sensor 48 provides a grating wavelength shift to pressure sensitivity ratio of about 0.5 picometers/psi (or 2.0 psi/pm) and may be used as a 0 to 5,000 psi sensor for long term operation. We have found that the structure of FIG. 26 with the dimensions described above can withstand an external pressure of greater than 15 kpsi before breaking.

For a 0 to 15,000 psi operational range sensor, having a sensitivity of 0.3846 pm/psi (or 2.6 psi/pm), the dimensions may be as follows: wall thickness t2 of about 1 mm, the diameter d2 of about 1.12 mm, the outer diameter d9 of about 6 mm, the length L2 of about 7.4 mm, and the length (2*L3+L2) of about 49 mm and an overall length L1 of about 59 mm. For such a 15 Kpsi sensor, we have found that the break pressure is greater than about 45 Kpsi. Other operational ranges for the given dimensions may be used if desired.

Alternatively, the pistons 32 may extend axially beyond the end of the outer tube 50 as indicated by the axially extended regions 44. In that case, the regions 44 may be axially symmetric or not, depending on the application. For a single ended 15 Kpsi sensor, the length L20 of the section 44 may be about 20 mm. Also, there may be axially extended regions 36 (also discussed hereinafter with FIG. 8) on one or both axial ends. The length L21 of the axial extended sections 36 may be any desired length based on the design criteria, e.g., 12 mm. Other lengths may be used.

Alternatively, as discussed hereinbefore with the single-sided dogbone, the pistons 32 of the dogbone may have unequal lengths or there may be only one piston 32 having the length of the two pistons (2*L3) on one side of the tube/grating 30 and the end cap 46 on the other side. In the later case, there would be more compression of the single piston 32 due to its increased length. Also, if the sensor is not a feed-through design (i.e., single ended), one end may be cleaved at an angle to reduce optical back-reflections, e.g., 12 deg. from vertical, as indicated by a dashed line 59. Other angles may be used.

Also, such a configuration allows for the sensitivity (or resolution) to be scaled by changing the overall length L1 (i.e., the lengths L3 of the pistons 32 and outer tube 50). In particular (for a given length of the pistons 32 and the tube 50), for a change ΔL in length L1 due to a pressure change, a large portion ΔL' of the change ΔL occurs across the length L2 of the small section 30 where the grating 12 is located (the remainder being across as the large pistons 32). Then, if the length of the pistons 32 and the tube 50 are increased, the tube 50 will compress or deflect more (i.e., a larger ΔL) for the same pressure change (because the amount of compression for a given force scales with length). This increased ΔL is seen across the same length L2, thereby increasing the sensitivity ΔL/L2 (discussed more hereinafter with FIG. 7).

Other values for the gap g2 and thickness t2, the lengths L1, L2, L3, and the diameters d2, d3 may be used if desired depending on the design specification and application. For example, there are various ways to increase the sensitivity (pm/psi), such as decreasing the wall thickness t2 (while withstanding the required maximum external pressure), increasing the gap g2, increasing the overall length L1 between where the outer tube 50 is fused to the pistons 32 (e.g., increase the tube 50 length and the piston length L3), decreasing the diameter d2 of the narrow section of the dogbone, or increasing the diameter d3 of the large sections 32 (or pistons) of the dogbone. In particular, for a sensitivity of about 0.6 picometers/psi, the overall length L1 may be increased from about 3.56 cm (1.4 inches) to about 5.08 cm (2.0 inches).

Also, in that case, the chamber 34 would be an I-shaped (or rotated H-shaped) chamber. Further, there may be a bump 52 near where the outer tube 50 fuses to the inner tube 20.

Figure 5:
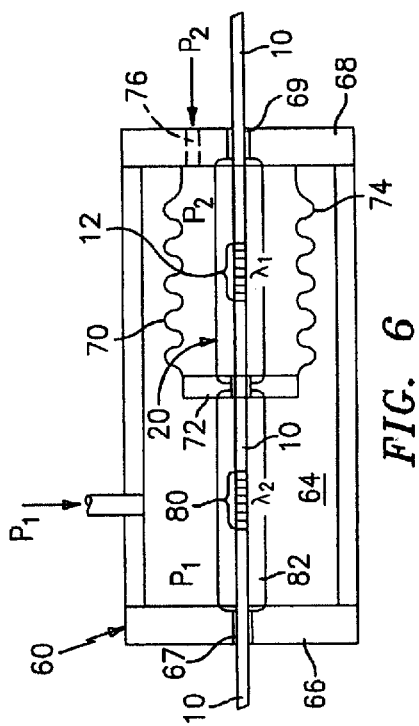
FIG. 5 is a side view of an alternative embodiment of a tube-encased fiber grating sensor, in accordance with the present invention.

Referring to FIG. 5, an alternative embodiment of the present invention comprises a housing 60 having a pressure port 62 and an interior chamber 64. The pressure port 62 ports pressure Pl into the chamber 64. The fiber 10 passes through a front wall (or end cap) 66 of the housing 60 through a hermetic feed-through 67 and exits through a rear wall (or end cap) 68 of the housing 60 through a hermetic feed-through 69. A bellows 70 is located within the chamber 64 and has one end of the bellows 70 connected to the rear housing wall 68 and the other end connected to a bellows plate 72. The tube 20 is located within a bellows 70 and is positioned between the rear housing wall 68 and the bellows plate 72 which is free to move axially. A portion 73 of the fiber 10 outside the bellows 70 may have slack to allow the fiber 10 to flex with compression of the bellows 70 without placing the portion 73 of the fiber 10 in tension. The slack may be provided by a bend or helix wrap or other strain relief technique for the fiber 10. The plate 72 and the wall 68 apply axial forces against the grating/tube 20 within the bellows 70. Between the tube 20 and the bellows 70 is a bellows chamber 74. The pressure P2 in the bellows chamber 74 may be 0 psi for an absolute sensor or atmospheric pressure, e.g., 14.7 psi (1 atm), or other fixed pressures. If a delta-P pressure sensor is desired, a pressure port 76 may be provided to port a second pressure P2 into the bellows chamber 74. The axial ends of the tube 20 may be recessed into the plate 72 and wall 68 as shown in FIG. 5 or be flush against the plate 72 and/or the wall 68.

As pressure P1 increases around the outside of the bellows 70, it causes the bellows 70 to shorten or compress (and the plate 72 to move to the right), which compresses the tube 20 and the grating 12, and causes the reflection wavelength λ1 light from the grating 12 to decrease. The spring constant of the bellows 70 is selected to be small relative to the spring constant of the tube 20, but large enough to not rupture under applied pressure. This minimizes error induced by creep by delivering the maximum amount of source pressure to the tube 20. The tube 20 may also be shaped in a dogbone geometry or other shapes as discussed herein if desired. Alternatively, if the pressure P2 is greater than P1 by a predetermined amount, the tube 20 (and the bellows 70) would expand axially and the reflection wavelength of the grating 12 would increase.

Figure 6:
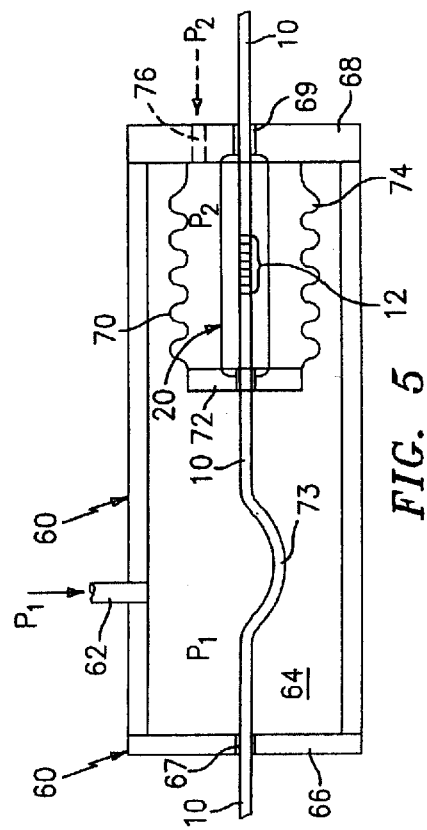
FIG. 6 is a side view of an alternative embodiment of a tube-encased fiber grating sensor, in accordance with the present invention.

Referring to FIG. 6, another embodiment of the present invention comprises two encased gratings in a push/pull arrangement. In particular, the configuration is substantially the same as that shown in FIG. 5, with a second grating 80 encased in a second tube 82 similar to the first tube 20 having a second reflection wavelength λ2. The grating-encased tube 82 is positioned between the plate 72 and the front wall 66 of the housing 60. With this design, at "zero" applied pressure P1, strain is developed across the second grating 80 by the spring force of the bellows 70, while the first grating 12 is left unstrained (or at a lower strain). As pressure P1 is increased, the bellows 70 compress, releasing the strain on the second grating 80, and applying more compression to the first grating 12. Other push-pull strain conditions and configurations on the gratings 12, 80 may be used if desired. Alternatively, if the pressure P2 is greater than P1 by a predetermined amount, the tube 20 (and the bellows 70) would expand axially and the reflection wavelength of the grating 12 would increase.

In this configuration, the pressure is determined by measuring the difference between the reflection wavelengths λ1, λ2 of the two gratings 12, 80, since both grating wavelengths λ1, λ2 move in opposite directions as pressure is changed. Thus, the force required to obtain a given wavelength shift (Δλ) is one half that of a single grating transducer, or, alternately, for a give force, the wavelength shift is double that of a single grating transducer. Also, the two grating wavelengths λ1, λ2 shift in the same direction as the temperature changes. Thus, by measuring the shift in the average value of the two reflection wavelengths λ1, λ2, the temperature can be determined, which allows for temperature compensation to be performed. Also, if creep exists, the maximum creep error can be determined. In particular, the average reflection wavelength between the two gratings should remain the same if no creep exists for a given temperature and pressure.

Figure 7:
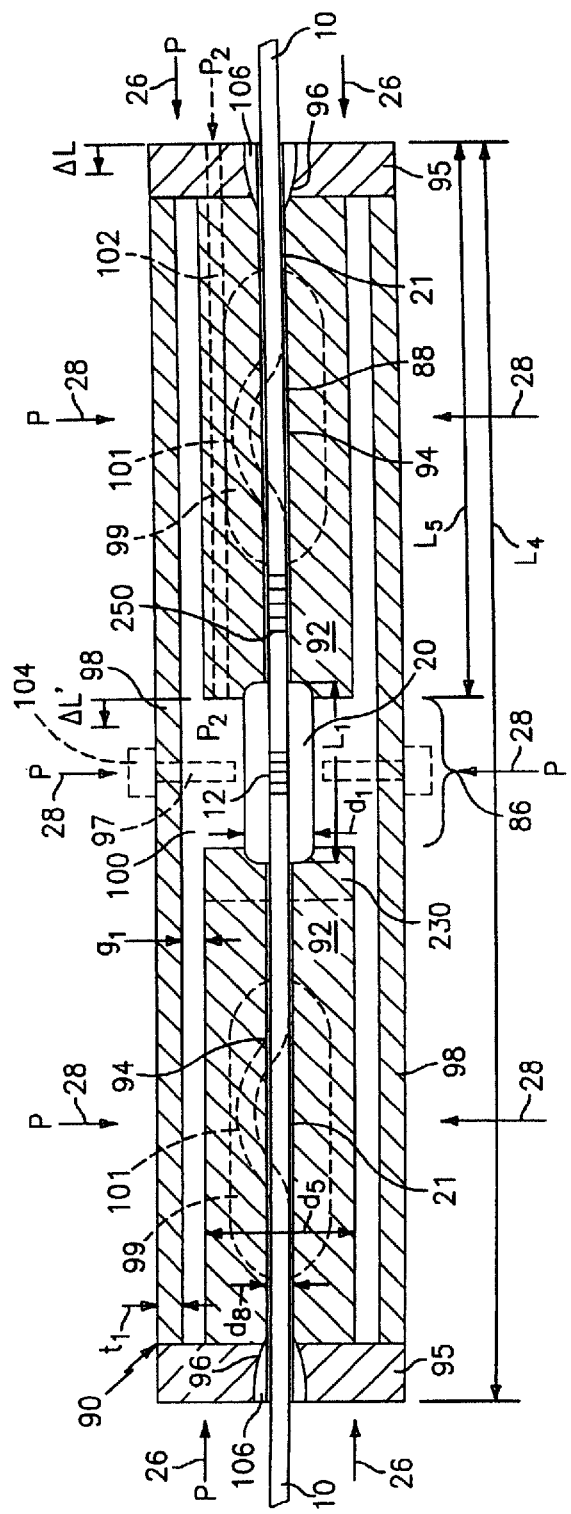
FIG. 7 is a side view of an alternative embodiment of a tube-encased fiber grating sensor, in accordance with the present invention.

Referring to FIG. 7, another embodiment of the present invention comprises a cylindrical-shaped housing 90 comprising an outer cylindrical wall (or outer tube) 98, two end caps 95, and two inner cylinders (or pistons) 92 each connected at one end to one of the end caps 95. The tube 20 (with the grating 12 encased therein) is disposed against the other ends of and between the two pistons 92. Other cross-sectional and/or side-view sectional shapes may be used for the housing 90 and elements 98, 95, 92 if desired. The end caps 95 may be separate pieces or part of and contiguous with the pistons 92 and/or the outer cylinder 98. The pressure P (26, 28) is applied to the external walls 98, 95 of the housing 90. The pistons 92 have holes 94 having a diameter d8, which the fiber 10 passes through. The end caps 95 of the housing 90 may have tapered regions 96 to provide strain relief as discussed hereinbefore. Also, the end caps 95 have feedthroughs 106 where the fiber 10 exits and may be hermetically sealed feedthroughs. Any known optical fiber hermetic feedthrough may be used for the feedthroughs 106, such as plating the fiber 10 with a metal and soldering the fiber to the feedthrough 106. Between the tube 20 and the feedthroughs 106, the fiber 10 may have the external protective buffer layer 21 discussed hereinbefore to protect the outer surface of the fiber 10 from damage. Also, a region 88 between the fiber 10 and the inner dimension of the hole 94 may be filled with a liquid or solid material, e.g., silicone gel, that further protects the fiber 10 and/or is thermally conductive to allow a temperature grating 250 (discussed hereinafter) to quickly sense changes in the temperature of the pressure grating 12, or for other uses.

Between the inside dimension of the walls 98 and the outside dimension of tube 20 and pistons 92 is an inner I-shaped (or rotated H-shaped) chamber 100. Also, there may be hollow regions 99 in the pistons 92 to allow some slack or service loop 101 in the fiber 10 between the tube 20 and the end 106 of the housing 90 to accommodate for thermal expansion of the pistons 92 or for other reasons. The pistons 92, the outer cylinder walls 98, the end caps 95, and the tube 20 may be made of the same or different materials. Further, the pistons 92 may be of unequal length or there may be only one piston having the length of the two pistons 92 on one side of the tube 20 and the end cap 95 on the other side. In the later case, there would be more compression of the single piston 92 due to its increased length.

An example of some possible dimensions for the housing 90 are as follows: The tube 20 has the outer diameter d2 of about 2 mm (0.07 inches) and a length L1 of about 12.5 mm (0.5 in.); the pistons 92 each have outer diameters d5 of about 19.1 mm (0.75 inches); the length L5 of each of the pistons 92 is about 6.25 cm (2.5 in.); the diameter of the holes 94 in the pistons 92 is about 1 mm (1000 microns); the overall length L4 of the housing 90 is about 12.7 cm (5 inches); the thickness t1 of the outside walls 98 is about 1.0 mm (0.04 inches); and the gap g1 between the inner dimension of the outer walls 98 and the outer dimensions of the pistons 92 is about 1.52 mm (0.06 inches). The walls 98 should be made of a material and thickness capable of withstanding the external pressure P applied to the housing 90.

The dimensions, materials, and material properties (e.g., Poisson's ratio, Young's Modulus, Coefficient of Thermal Expansion, and other known properties) of the walls 98 and the pistons 92 are selected such that the desired strain is delivered to the capillary tube 20 at a specified pressure P (or external force per unit area). The resolution and range for sensing pressure P are scalable by controlling these parameters. For example, if the overall length L4 is increased, the sensitivity ΔL/L will increase.

In particular, as the pressure P increases, the axial length L4 of the housing 90 decreases by an amount ΔL due to compression and/or deflection of the outer walls 98. A predetermined portion of the total axial length change ΔL' is seen at the tube 20 due to compression of the tube 20. Compression of the tube 20 lowers the Bragg reflection wavelength λ1 of the grating 12 by a predetermined amount which provides a wavelength shift indicative of the pressure P. If the pistons 92 have a spring constant higher than that of the glass tube 20, the tube 20 will be compressed more than the pistons 92 for a given force. Also, for a given external force, a predetermined amount of the force is dropped across the outside walls 98, and the remainder is seen by the tube 20.

The housing 90 may be made of a material having high strength, low Poisson ratio and low Young's modulus, such as titanium (Ti). For example, when the walls 98, pistons 92 and end caps 95 are all made of titanium having the dimensions discussed hereinbefore, for an external force of 2200 lbf, 2000 lbf is dropped across (or used to compress/deflect) the outside walls 98, and 200 lbf is dropped across the tube 20. The cylinder walls 98 act similar to a diaphragm or bellows which compress or deflect due to increased external pressure. Other metals and metal alloys may be used for some or all of the parts 92, 98, 95 of the housing 90. These include stainless steel, titanium, nickel-based alloys, such as Inconel®, Incoloy®, Nimonic® (registered trademarks of Inco Alloys International, Inc.) containing various levels of Nickel, Carbon, Chromium, Iron, Molybdenum, and Titanium (e.g., Inconel 625). Other high strength, or corrosion resistant, or high temperature or heat resistant metals or alloys may also be used, or other materials having sufficient strength to compress the tube 20. Other materials having other properties may be used if desired depending on the application.

Typical approximate values for the Poisson ratio, Young's Modulus and the Coefficient of Thermal Expansion (CTE) for titanium are provided in Table 2 below.

TABLE 2

| Material | Poisson's ratio | Young's modulus | CTE |
|---|---|---|---|
| Titanium (Ti) | 0.3 | 15.5 kpsi | 10.5 × 10⁻⁶/° C. |

Alternatively, one or more of the parts 92, 95, 98 of the housing 90 may be made of a glass material. In that case, one or more of the glass materials and properties shown in Table 1 hereinbefore may be used. Other materials may be used for the housing 90 if desired, depending on the application and design requirements.

The tube 20 may have the dogbone shape discussed hereinbefore with FIGS. 2, 3. Also, the sensor housing 90 may be split transversely into two halves that are assembled as indicated at the attachment points 104. Alternatively, the housing 90 may be split longitudinally. Further, a spacer or disk 97 may be provided to aid in assembly, alignment, and/or setting the pre-strain on the tube 20. Other assembly techniques may be used if desired.

Also, the axial end faces of the tube 20 and/or the seats on the pistons 92 may be plated with a material that reduces stresses or enhances the mating of the tube 20 with the seat surface on the pistons 92.

To make a delta-P sensor, a pressure port 102 may be provided through one or both of the pistons 92 to port a second pressure P2 into the inner I-shaped chamber 100.

The configuration of FIG. 7 requires no bellows and is therefore likely easier and cheaper to fabricate than a bellows-based design. Also, it has a robust construction capable of enduring harsh environments.

Figure 8:
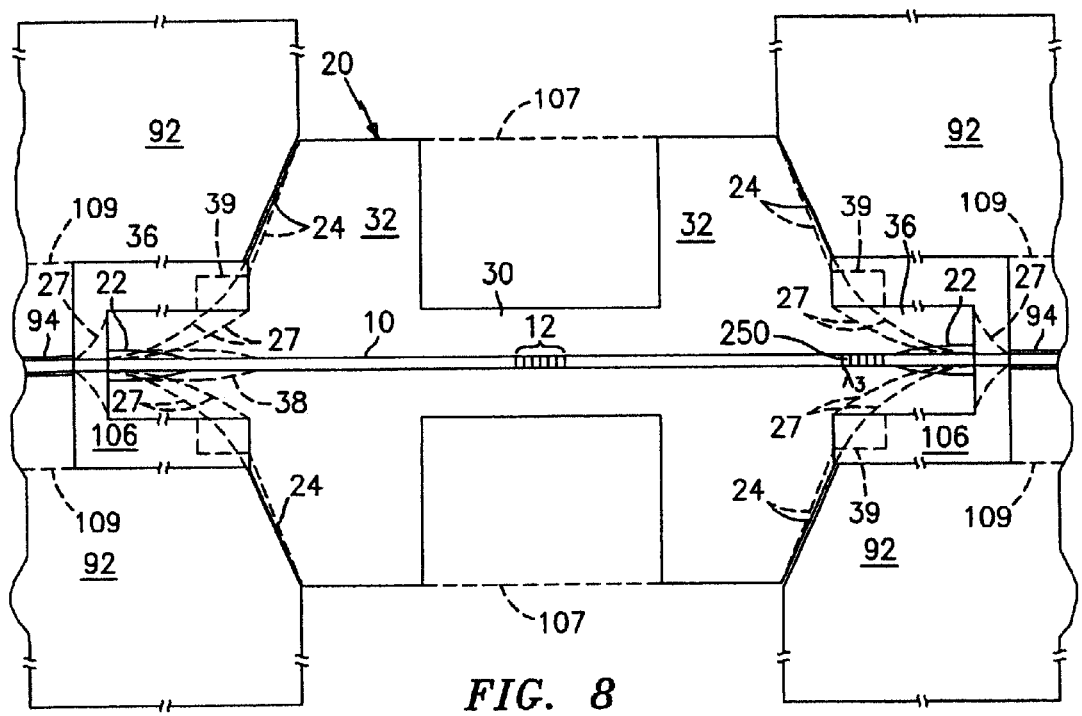
FIG. 8 is a side view of an alternative embodiment of a tube-encased fiber grating sensor, in accordance with the present invention.

Referring to FIG. 8, alternatively, to help reduce strain on the fiber 10 at the interface between the fiber 10 and the tube 20, the tube 20 may have the sections 36 which extend axially along the fiber 10 and attach to the fiber 10 at a location that is axially outside where the pressure (or force) is applied on the large sections 32 by the pistons 92 (or other end pieces as described herein). The axial lengths of the sections are set depending on the application, as discussed hereinbefore with FIG. 26. Also, the sections 36 need not be axially symmetrical, and need not be on both axial ends of the tube 20. The sections 32 may have the inner tapered regions 22 or the outer fluted sections 27 where the fiber interfaces with the tube 20, as discussed hereinbefore. Alternatively, there may be a stepped section 39 as part of the sections 36. In that case, the region 22 may be within or near to the stepped section 39 as indicated by dashed lines 38. The regions 106 may be air or filled with an adhesive or filler. Also, the tube 20 may have a constant cross-section as discussed hereinbefore and as indicated by the dashed lines 107 instead of a dogbone shape. Further, the hole 94 through the pistons 92 may have a larger diameter as indicated by the dashed lines 109 for all or a portion of the length of the hole 94.

Figure 12:
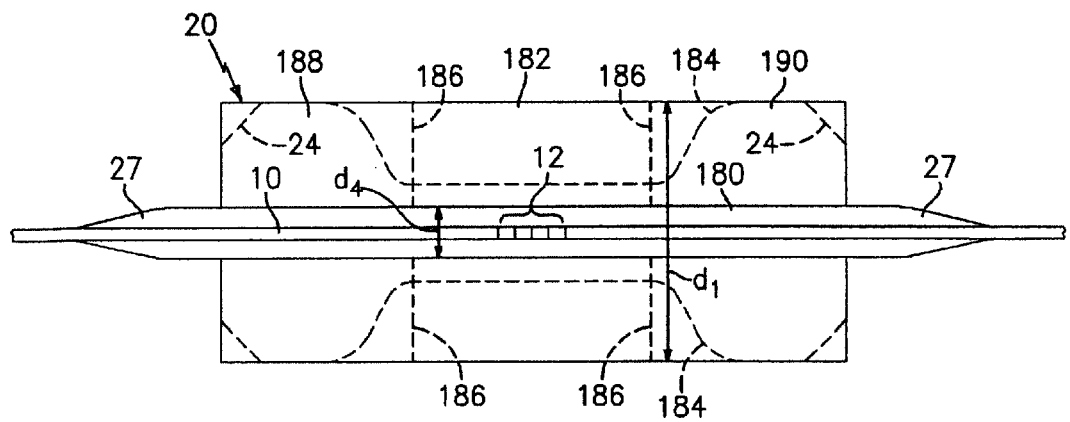
FIG. 12 is a side view of an alternative embodiment of a tube-encased fiber grating sensor having a dual capillary tube, in accordance with the present invention.

Referring to FIG. 12, more than one concentric tube may be fused together to form the tube 20 of the present invention. For example, a small inner capillary tube 180 having a diameter d4 of about 0.5 mm (0.02 in.), may be located within a larger outer capillary tube 182, having the diameter d1 discussed hereinbefore, and the two tubes 180, 182 are fused together. One or both ends of the small tube 180 may be shrunk down and fused to the fiber 10 to form the fluted sections 27. Other values for the diameters d1, d4 of the inner and outer tubes 180, 182 may be used if desired. Also, more than two concentric capillary tubes may be used. The material of the tubes may be the same to minimize thermal expansion mismatch over temperature. Also, the shape of the outer tube 182 may have a dogbone shape as indicated by dashed lines 184, or other shapes as discussed hereinbefore. Alternatively, the dogbone shape may be created by fusing two separate tubes 188, 190 onto the inner tube 180 on opposite axial sides of the grating 12, as indicated by dashed lines 186.

Figure 13:
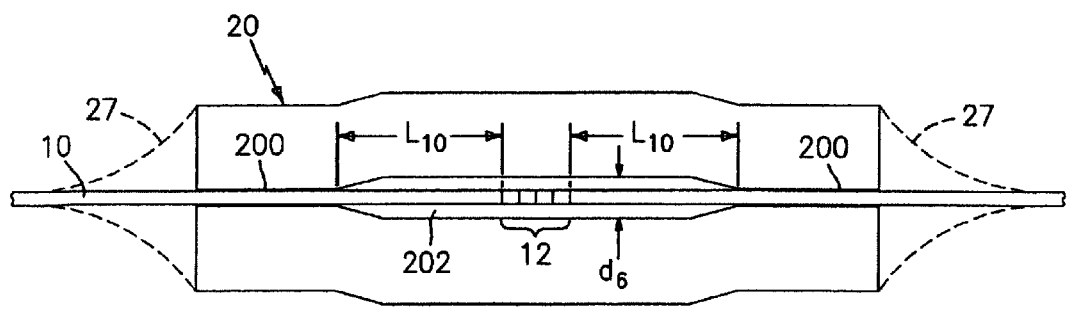
FIG. 13 is a side view of an alternative embodiment of a tube-encased fiber grating sensor having a capillary tube collapsed and fused to the fiber on opposite sides of a grating, in accordance with the present invention.
Figure 14:
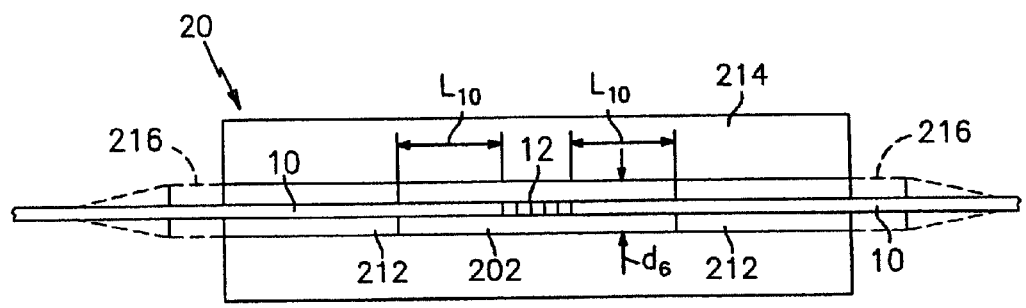
FIG. 14 is a side view of an alternative embodiment of a tube-encased fiber grating sensor of FIG. 13, in accordance with the present invention.

Referring to FIGS. 13 and 14, alternatively, the tube 20 may be fused to the fiber 10 on opposite axial ends of the grating 12 adjacent to or a predetermined distance L10 from the grating 12, where L10 can be any desired length or at the edge of the grating 12 (L10=zero). In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material. The inner diameter d6 of the tube 20 is about 0.1 to 10 microns larger than the diameter of the optical fiber 10, e.g., 125.1 to 136 micron. Other diameters may be used; however, to help avoid fiber buckling when the tube 20 is axially compressed, the diameter d6 should be as close as possible to the fiber 10 outer diameter to limit the amount of radial movement of the grating 12 and fiber 10 between the fusion points. Also, the distance L10 need not be symmetric around both sides of the grating 12.

Referring to FIG. 14, alternatively, the same result can be achieved by fusing two separate tubes 212 on opposite sides of the grating 12, and then fusing an outer tube 214 across the tubes 212. Alternatively, the tubes 212 may extend beyond the ends of the outer tube 214 as indicated by the dashed lines 216. Alternatively, the tube 20 may be a single piece with a shape indicative of the tubes 212, 214.

Referring to FIGS. 7, 8, 15, 17, 19 the reflection wavelength of the grating 12 changes with temperature ($\Delta\lambda/\Delta T$), as is known. Also, the strain on the grating 12 may change over temperature due to a thermal mismatch between the tube 20 and the fiber 10. Also, the force on the tube 20 may change over temperature due to the expansion or contraction of the housing 90 over temperature. In that case, a separate temperature grating 250 may be used to measure temperature to correct for temperature-induced shifts in the reflection wavelength $\lambda 1$ of the pressure grating 12. The temperature grating 250 has a reflection wavelength $\lambda 3$ that is different from the reflection wavelength of the pressure grating 12 and that changes with change in temperature but does not change due to a change in the pressure P. This is achieved by locating the temperature grating 250 in thermal proximity to the pressure grating 12, outside the pressure-strained region of the tube 20 and otherwise isolated from the pressure being measured. In particular, the temperature grating 250 may be located in the fiber 10 between the tube and the feedthrough 106. Referring to FIG. 8, alternatively, the temperature grating 250 may be located in the fiber 10 portion that is encased or fused in the axially protruding section 27, 36 of the glass tube 20, outside the region that is compressed by the pistons 92. Alternatively, the temperature grating 250 may be in a separate optical fiber (not shown) located near or in the sensor housing 90 and may be optically coupled to the fiber 10 or separate from the fiber 10. Alternatively, the temperature grating 250 may be a strain-isolated temperature sensor in a separate tube (not shown), such as that described in commonly-owned, copending U.S. patent application Ser. No. 09/455,866, entitled "Strain-Isolated Fiber Grating Temperature Sensor" filed contemporaneously herewith. Also, for any of the embodiments shown herein, the temperature grating 250 may be encased in the tube 20 having an initial pre-strain on the grating (compression or tension) or no pre-strain.

Figure 28:
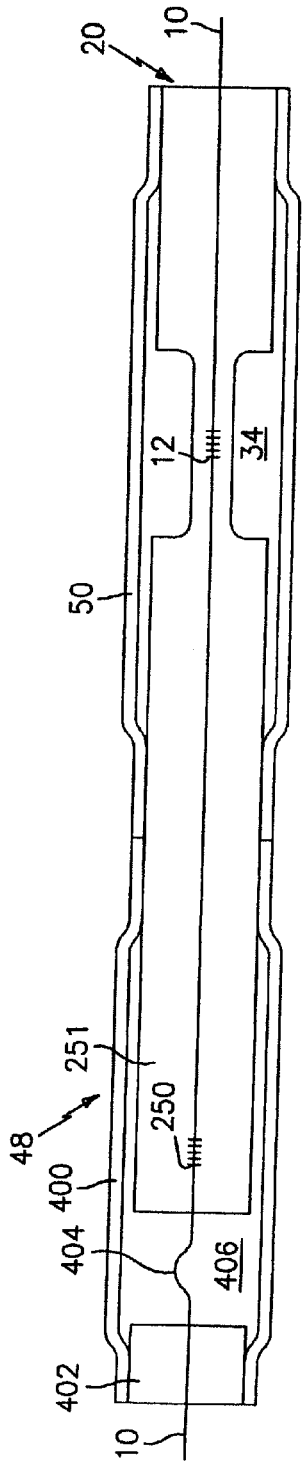
FIG. 28 is an alternative embodiment of a tube-encased fiber grating sensor having a pressure-isolated temperature grating, in accordance with the present invention.

Referring to FIG. 28, alternatively, the temperature grating 250 in the extended section 251 may be encased in a second outer tube 400 to form a pressure-isolated temperature sensor such as is discussed in copending U.S. patent application Ser. No. 09/445/113, entitled "Pressure-Isolated Fiber Grating Temperature Sensor", which is incorporated herein by reference. In particular, the second tube 400 is fused to the section 251 and to the outer diameter of an end cap tube 402. The end cap tube 402 may be made of the same material as the tube 20. The fiber 10 is fed through and fused to the end cap tube 402 similar to the way the fiber 10 is fused to the tube 20. A sealed chamber 406 exists between the section 251, the end cap tube 402, and the outer tube 400. Also, the fiber 10 has some slack 404 to allow the chamber 406 to expand. As the external pressure changes, the outer tube 400 compresses or deflects, the end cap tube 402 and/or the section 251 move toward each other, and the fiber 10 flexes in the chamber 406; however, the section 251 with the grating 250 is not exposed to the pressure change. Thus, the reflection wavelength of the temperature grating 250 does not change due to the pressure change. Further, the outer tube 50 and the second outer tube 400 may be one tube that is fused to the inner tubes 20, 402. Other embodiments and configurations for the pressure-isolated temperature sensor may be used such as those described in the aforementioned patent application Ser. No. 09/445,113. Also, for a non-feed through sensor, instead of the fiber 10 being fed through the chamber 406 and the end cap 402, the fiber 10 may end within the section 251 to the left of the temperature grating 250. Further, instead of the end cap 402, the tube 400 may be collapsed on itself to form the chamber 406.

Figure 29:
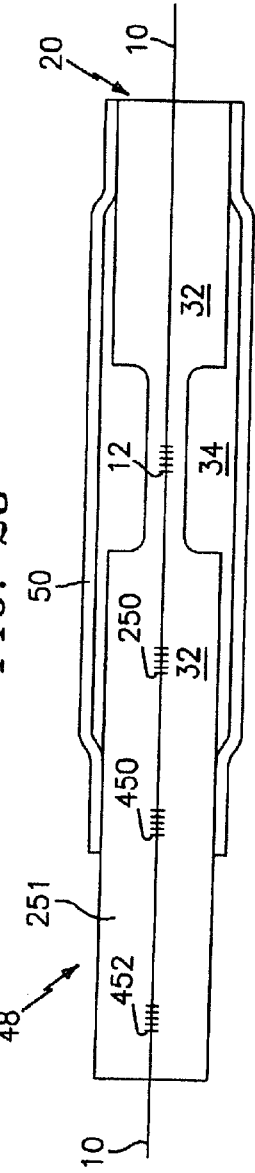
FIG. 29 is an alternative embodiment of a tube-encased fiber grating sensor having a temperature grating exposed to pressure, in accordance with the present invention.

Referring to FIG. 29, alternatively, the temperature grating 250 may be located in a non-pressure-isolated area, such as in the wide region 32 of the dogbone geometry. In that case, both the gratings 12, 250 are subjected to pressure and temperature variations where the pressure-to-wavelength shift sensitivities for the gratings 12, 250 are different. Thus, pressure and temperature can be analytically determined. Alternatively, if the change in wavelength with temperature is the same (or predictable) for both gratings 12, 250, and the change in wavelength with pressure is different for the two gratings 12, 250, then a temperature-compensated pressure measurement can be obtained analytically, e.g., by subtracting the two wavelengths. Alternatively, a temperature grating 450 may be located in the region where the outer tube 50 is fused to the inner tube 20 or a temperature grating 452 may be located in the axial extended section 251. In those locations, the temperature gratings 450, 452 would exhibit a lower sensitivity to pressure changes than the temperature grating 250, which may increase the temperature compensation accuracy.

Alternatively, instead of using a fiber grating to measure the temperature of the pressure grating 12, any other technique may be used to determine the temperature of the pressure grating 12, e.g., electronic, thermocouple, optical, etc.

Referring again to FIG. 7, the housing 90 may be designed to minimize changes in compression of the tube 10 over temperature. In particular, if the walls 98 and the pistons 92 are made of the same material, e.g., titanium, and the tube 20 is made of a different material, e.g., glass, having a lower CTE, as temperature increases, the pistons 92 will increase in length as much as the outer walls 98, except over the region 86 between the ends of the pistons 92 (where a CTE mismatch will exist). As a result, the force on tube 20 decreases as temperature increases. Alternatively, a section 230 on one or both pistons 92 may be made of a material that has a CTE that compensates for the additional expansion of the section 86 to maintain a substantially constant force on the tube 20 over temperature. Alternatively, the outer walls 98 may be made of a material that has a CTE so as to maintain a substantially constant force on the tube 20 over temperature or otherwise compensate for a predetermined amount of force change over temperature.

Figure 15:
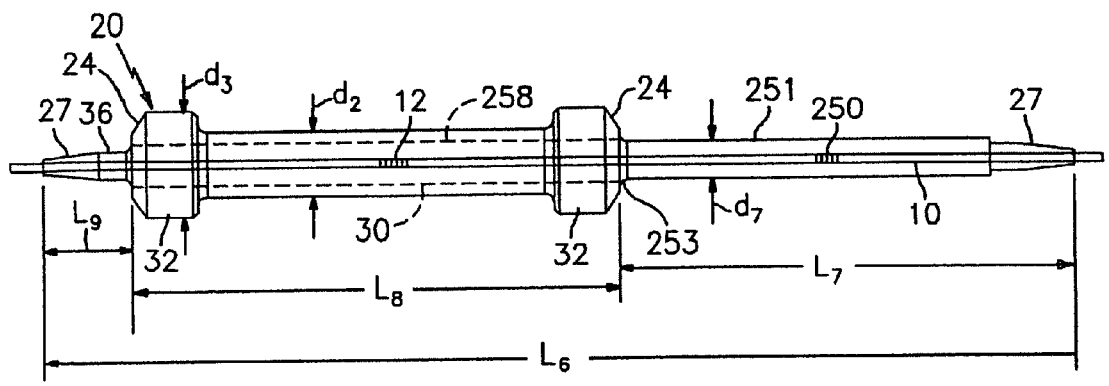
FIG. 15 is a side view of an alternative embodiment of a tube-encased fiber grating having a long axially protruding section, in accordance with the present invention.

Referring to FIG. 15, an alternative geometry for the capillary tube 20 may have one axial end 251 that is longer than the other axial end. In that case, the temperature compensating grating 250 may be located in the fiber 10 in the long axial end 251. Some exemplary dimensions for the tube 20 of FIG. 15 are as follows: L6 is about 1.05 inches; L7 is about 0.459 inches; L8 is about 0.5 inches; L9 is about 0.09 inches; and d7 is about 0.032 inches. The long axial end 251 may be made by fusing the section 251 to the section 32 (before or after the fiber 10 is encased in the tube 20) at a point 253 or may be made by other methods discussed hereinbefore for making the dogbone or other shapes for the tube 20. Alternatively, tube 20 shown in FIG. 15 with the section 251 may be formed by using two tubes, an inner tube with the length L6 slid through the dogbone sections 30, 32 as indicated by the dashed lines 258 and fused to the sections 30, 32 similar to that discussed with FIG. 12.

Figure 17:
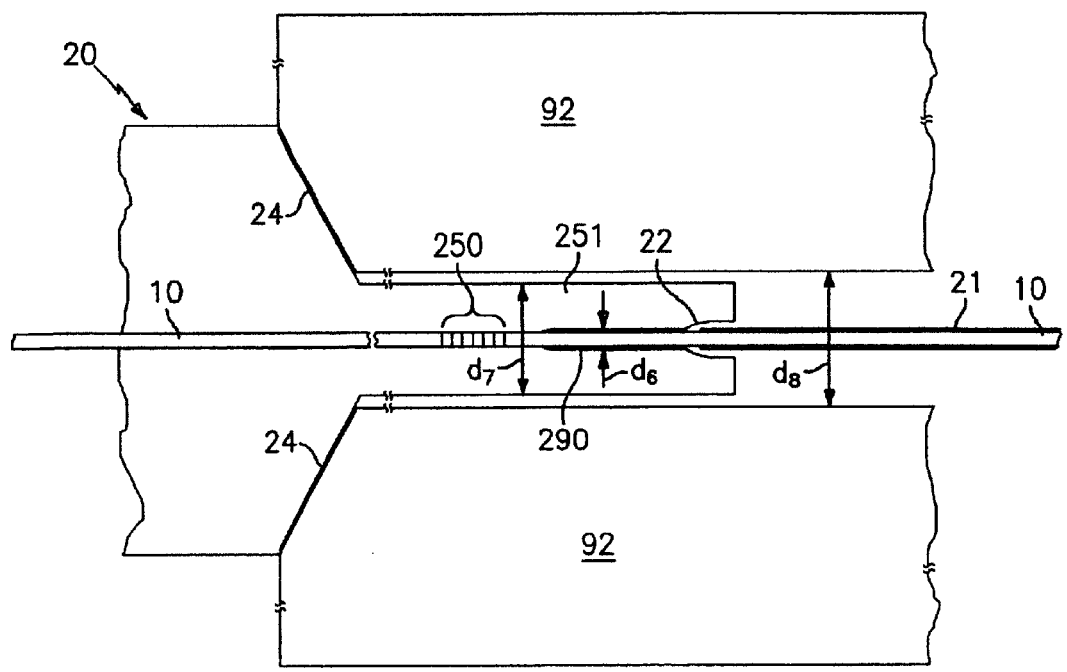
FIG. 17 is a side view of an alternative embodiment of a tube-encased fiber grating sensor having a long axially protruding section with a portion that is not collapsed onto the fiber, in accordance with the present invention.

Referring to FIG. 17, the long axial end 251 may be collapsed and fused to the fiber 10 where the temperature grating 250 is located and not collapsed onto the fiber 10 at a region 290 near the end of the section 251. In that case, the region 290 may be filled with an epoxy or other filter. The inner diameter d6 of the tube 20 in the section 290 is about 125 to 135 microns and the diameter d8 of the hole 94 is about 1 mm (1000 microns) as discussed hereinbefore. Other diameters and dimensions may be used if desired. Where the fiber 10 exits the extended region 251, the fiber 10 may have the external protective buffer layer 21 to protect the outer surface of the fiber 10 from damage, as discussed hereinbefore.

Figure 19:
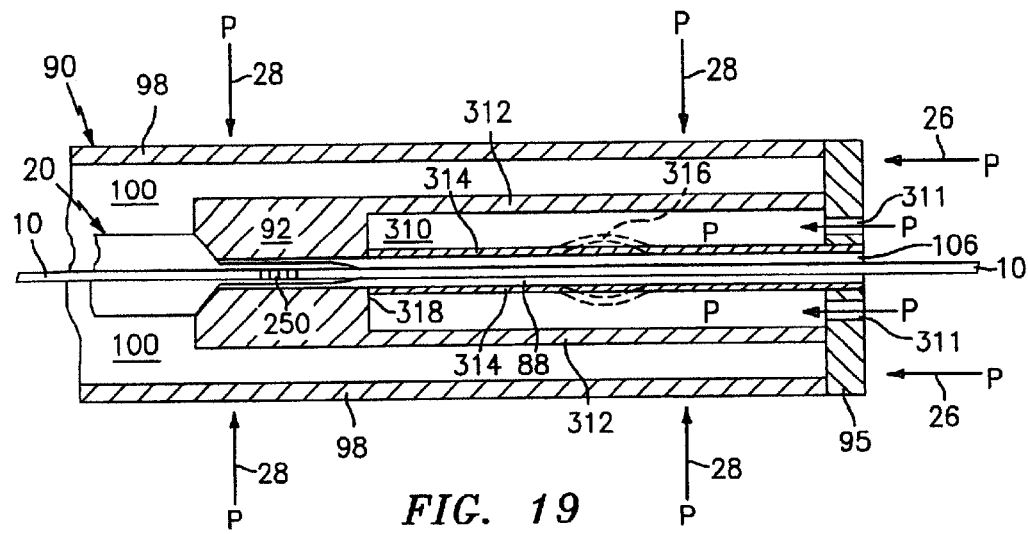
FIG. 19 is a side view of an alternative embodiment of a tube-encased fiber grating sensor having a piston that has a hollow section ported to pressure, in accordance with the present invention.
Figure 20:
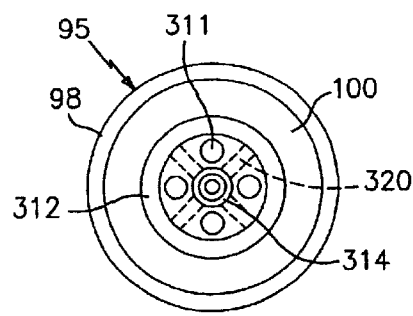
FIG. 20 is a side view of the alternative embodiment of FIG. 19, in accordance with the present invention.

Referring to FIG. 19, one or both of the pistons 92 may have a hollow section 310 which is ported to the external pressure P through holes 311 in the end cap 95. The hollow section 310 has outer walls 312 and inner walls 314. Such a configuration may be used to help increase sensitivity, or for other reasons. The length and thickness of the walls 312, 314 will determine the amount of increased sensitivity that exists. For example, as the pressure P increases, the walls 312, 314 will be put in tension and the piston 92 will lengthen. Alternatively, the inner wall 314 may be a pipe that may have a different material than the rest of the piston 92 and that is attached to the pistons 92 at a point 318. Also, the wall 314 may have a bulge 316 to allow for slack in the fiber 10. Alternatively, the inner wall 314 eliminated if desired. In that case, the fiber 10 would be exposed to the pressure P. The fiber 10 may have the external protective buffer coating 21 as discussed hereinbefore. Referring to FIG. 20, the end cap 95 may have holes 311 or support beams 320 to stabilize the wall and/or to provide a stable exit point for the fiber 10.

Figure 16:
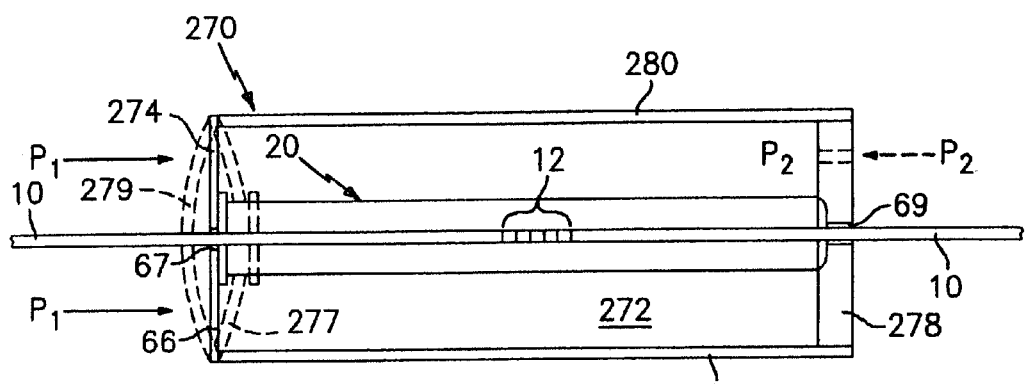
FIG. 16 is a side view of an alternative embodiment of a tube-encased fiber grating sensor having a diaphragm, in accordance with the present invention.

Referring to FIG. 16, in an alternative embodiment, a housing 270 has a diaphragm 274 which is connected to one end of the tube 20. The other end of the tube 20 is connected to a rigid back wall 278. Rigid walls 280 connect the back wall 278 and the diaphragm 274. Inside the housing 270 is a chamber (or cavity) 272. The chamber 272 may be evacuated, be at atmospheric pressure, or be ported to a second pressure P2, for a differential pressure (or delta P) measurement. As the pressure P1 increases, the diaphragm 274 deflects into the chamber 272, as indicated by dashed lines 277, which compresses the tube 20 and the grating 12 causing a wavelength shift. Alternatively, if the pressure P2 is greater than P1 the diaphragm 274 will deflect outward as indicated by dashed lines 279.

Figure 18:
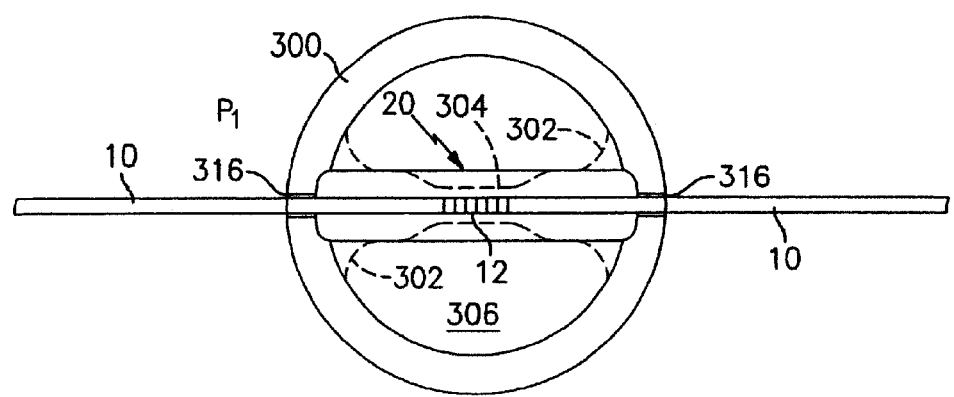
FIG. 18 is a side view of an alternative embodiment of a tube-encased fiber grating sensor having a circular housing cross-section, in accordance with the present invention.

Referring to FIG. 18, an alternative embodiment of the present invention has a housing 300 having a circular side-view section and an inner chamber 306. The overall shape of the housing 300 may be a sphere or a cylinder or other shapes having a circular cross-section. The tube 20 with the fiber 10 and grating 12 encased therein is attached to the inner diameter of the housing 300. The fiber 10 exits the housing 300 at feedthrough points 316, which may be hermetic feedthroughs, as discussed hereinbefore. As the external pressure P1 increases, the diameter of the housing 300 decreases and the tube 20 is compressed which results in a shift in the reflection wavelength of the grating 12 as discussed hereinbefore. The amount of wavelength shift for a given pressure change will depend on the material properties of the housing 300 and the tube 20, e.g., Poisson's ratio, Young's modulus, etc., as discussed hereinbefore. If the housing 300 and the tube 20 are a similar material, e.g., glass, the tube 20 may be part of or fused to the housing 300 as shown by dashed lines 302. In that case, stresses between the housing 300 and the tube 20 may likely be lower. Also, the tube 20 may have a dogbone shape as indicated by dashed lines 304 or other shapes as discussed herein.

Figure 11:
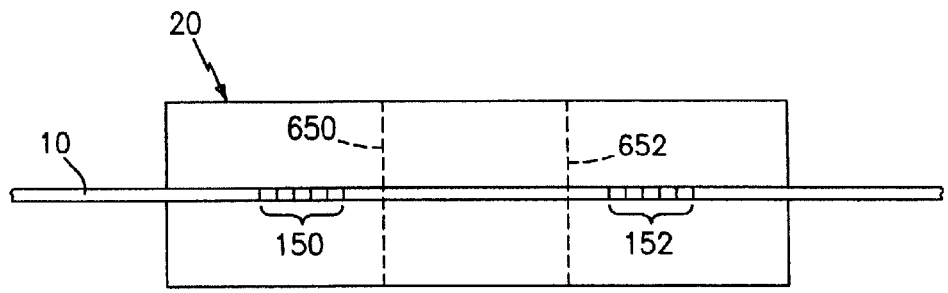
FIG. 11 is a side view of an alternative embodiment of a tube-encased fiber grating sensor having two gratings in a fiber encased in a tube, in accordance with the present invention.

Referring to FIG. 11, for any of the embodiments described herein, instead of a single grating encased within the tube 20, two or more gratings 150, 152 may be embedded in the fiber 10 that is encased in the tube 20. The gratings 150, 152 may have the same reflection wavelengths and/or profiles or different wavelengths and/or profiles. The multiple gratings 150, 152 may be used individually in a known Fabry Perot arrangement. Further, one or more fiber lasers, such as those described in U.S. Pat. No. 5,513,913, entitled "Active Multipoint Fiber Laser Sensor," U.S. Pat. No. 5,564,832, entitled "Birefringent Active Fiber Laser Sensor," or U.S. Pat. No. 5,666,372, entitled "Compression Tuned Fiber Laser," may be embedded within the fiber 10 in the tube 20, and are incorporated herein by reference to the extent necessary to understand the present invention. In that case, the gratings. 150, 152 form an optical cavity and the fiber 10 at least between the gratings 150, 152 (and may also include the gratings 150, 152, and/or the fiber 10 outside the gratings, if desired) would be doped with a rare earth dopant, e.g., erbium and/or ytterbium, etc., and the lasing wavelength would shift as pressure changes.

Figure 30:
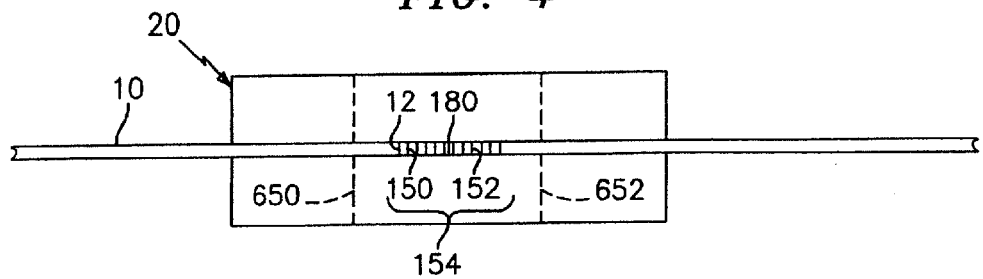
FIG. 30 is a side view of an alternative embodiment of a tube-encased fiber grating sensor having a tunable distributed feedback (DFB) fiber laser encased in a tube, in accordance with the present invention.

Referring to FIG. 30, another type of tunable fiber laser that may be used is a tunable distributed feedback (DFB) fiber laser 154, such as that described in V. C. Lauridsen et al., "Design of DFB Fibre Lasers," Electronic Letters, Oct. 15, 1998, Vol.34, No. 21, pp. 2028–2030; P. Varming et al., "Erbium Doped Fiber DGB Laser With Permanent $\pi/2$ Phase-Shift Induced by UV Post-Processing," IOOC'95, Tech. Digest, Vol. 5, PD1–3, 1995; U.S. Pat. No. 5,771,251, "Optical Fibre Distributed Feedback Laser," to Kringlebotn et al.; or U.S. Pat. No. 5,511,083, "Polarized Fiber Laser Source," to D'Amato et al. In that case, the grating 12 is written in a rare-earth doped fiber and configured to have a phase shift of $\lambda/2$ (where $\lambda$ is the lasing wavelength) at a predetermined location 180 near the center of the grating 12 which provides a well defined resonance condition that may be continuously tuned in single longitudinal mode operation without mode hopping, as is known. Alternatively, instead of a single grating, the two gratings 150, 152 may be placed close enough to form a cavity having a length of $(N+\frac{1}{2})\lambda$, where N is an integer (including 0) and the gratings 150, 152 are in rare-earth doped fiber.

Alternatively, the DFB laser 154 may be located on the fiber 10 between the pair of gratings 150, 152 (FIG. 11) where the fiber 10 is doped with a rare-earth dopant along at least a portion of the distance between the gratings 150, 152. Such configuration is referred to as an "interactive fiber laser", as is described by J. J. Pan et al., "Interactive Fiber Lasers with Low Noise and Controlled Output Power," E-tek Dynamics, Inc., San Jose, Calif., internet web site www.e-tek.com/products/ whitepapers. Other single or multiple fiber laser configurations may be disposed on the fiber 10 if desired.

Referring to FIG. 21, a plurality of the pressure sensors 20, 110, 112 described herein, each having at least one grating 12 encased therein, may be connected in series by the common optical fiber 10 to measure multiple pressure points as distributed sensors. Any known multiplexing techniques may be used to distinguish one sensor-signal from another sensor signal, such as wavelength division multiplexing (WDM), time division multiplexing (TDM), or other multiplexing techniques. In that case, the grating 12 in each sensor may have a different reflection wavelength.

Referring to FIGS. 22 and 23, alternatively, two or more fibers 10, 350, each having at least one grating 12, 352 therein, respectively, may be encased within the tube 20. In that case, the bore hole in the tube 20 prior to heating and fusing may be other than circular, e.g., square, triangle, etc. Also, the bore hole for the tube 20 need not be centered along the center line of the tube 20.

Referring to FIG. 24, alternatively, instead of the fibers 10, 350 touching each other as shown in FIG. 23, the fibers 10, 350 may be spaced apart in the tube 20 by a predetermined distance. The distance may be any desired distance between the fibers 10, 350. Also, for any of the embodiments shown herein, as discussed hereinbefore, part or all of an optical fiber and/or grating may be fused within, partially within or on the outer surface of the tube 20, as indicated by the fibers 500, 502, 504, respectively.

Referring to FIG. 25, alternatively, the tube 20 may be collapsed and fused onto the fiber 10 only where the grating 12 is located. In that case, if the tube 20 is longer than the grating 12, the inner tapered or flared regions 22 discussed hereinbefore may exist and the areas 19 between the tube 20 and the fiber 10 may be filled with a filler material, as discussed hereinbefore.

Figure 9:
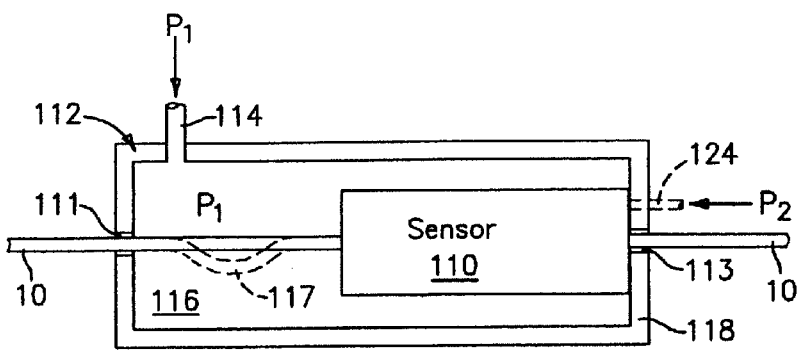
FIG. 9 is a side view of a tube-encased fiber grating sensor mounted to a wall of a housing, in accordance with the present invention.
Figure 10:
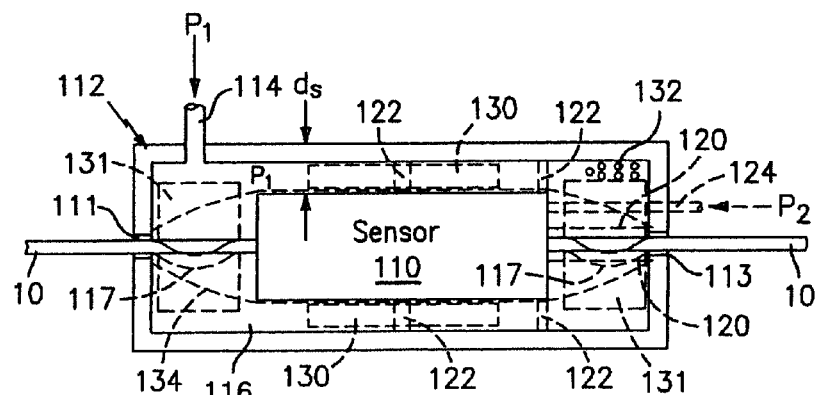
FIG. 10 is a side view of a tube-encased fiber grating sensor suspended within a housing, in accordance with the present invention.

Referring to FIGS. 9, 10, any of the sensor configurations described herein (shown collectively as a sensor 110) may be placed within a housing 112 having a pressure port 114 which ports a pressure P1 into a chamber 116 which exposes the sensor 110 to the pressure P1. The sensor 110 may be attached to at least one wall 118 of the housing 112 as shown in FIG. 9.

Referring to FIG. 10, instead of attaching one side of the sensor 110 to a wall of the housing 112, the sensor 110 may be suspended within the housing 112 by supports 120, 122 connected to one or more of the walls of the housing 112 and to one end of the sensor 110 (or from the middle or any other desired point along the sensor 110). The fiber 10 is fed through two hermetic feedthroughs 111, 113. Also, the fiber 10 may have some slack 117 between the sensor 110 and the feedthroughs 111, 113. Also, the sensor 110 may be a delta-P sensor if a second pressure P2 is ported to the sensor 110 as indicated by the lines 124.

Alternatively, instead of the supports 120, 122, the sensor 110 may be suspended by the fluid in the chamber 116, e.g., a viscous fluid, grease, silicone oil, or other fluids that provide shock and/or vibration isolation and prevent the sensor 110 from hitting the inner walls of the housing 112. Instead of or in addition to using a fluid to suspend the sensor 110, compliant radial and/or axial spacers (or seats) 130, 131 respectively, may be provided between the sensor 110 and the inner walls of the housing 112. The spacers 130, 131 may be floating or attached to the inner housing walls. Also, small solid granular pellets or gel capsules (liquid contained in a small compliant membrane bubble) 132 may also be used. The spacers 130, 131, or pellets/capsules 132 may be made of a compliant material such as Teflon®, polyimide, silicone, of other compliant materials. Alternatively, a fish net or sock-like lattice support 134 may be attached to opposite walls of the housing 112 on opposite axial sides of the sensor 110, which holds the sensor 110 between the inner walls of the housing 112 but which allows some motion of the sensor 110 and allows the pressure to be transferred to the sensor 110. Also, instead of the radial spacers 130, the radial space Ds between the sensor 110 and the inner walls of the housing 112 may be small (e.g., about 3 mm), if desired, with a layer or film of the fluid there-between to act as a protective layer. Any other technique for suspending the sensor 110 within the housing 112 that provides shock and vibration isolation and allows pressure P1 to be transferred to the sensor 110 may be used.

Figure 27:
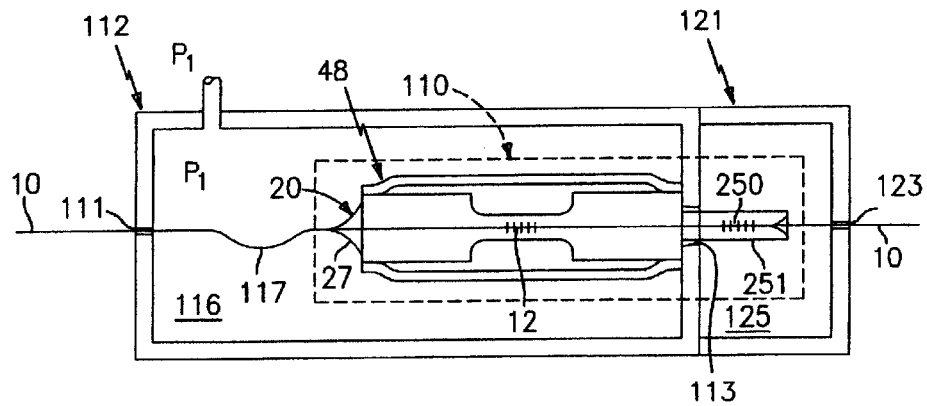
FIG. 27 is a tube-encased fiber grating sensor with a portion mounted inside a pressurized region of a housing and a portion of a tube located outside the pressurized region, in accordance the present invention.

Referring to FIG. 27, alternatively, the sensor 110 may be partially inside and partially outside the pressurized chamber 116. In that case, the pressure exposed portion 48 of the sensor 110 would be exposed to the pressure P1 and the axial extended portion 251 having the temperature grating 250 may be outside the chamber 116 and isolated from the pressure P1. Also, in that case, there may be an optional additional portion 121 added to the housing 112 to protect the axial extended portion 251, which creates a chamber 125, and the fiber 10 exits through a feedthrough 123. Alternatively, the temperature grating 250 may be exposed to the pressure P1, as discussed hereinbefore.

It should be understood that the glass-encased fiber grating pressure sensor of the present invention may be used in compression or compressive strain (e.g., where axial compression occurs with increasing pressure) or in tension or tensile strain, e.g., where axial elongation (increase in tension) or a decrease in length (decrease in tension) occurs with increasing pressure, depending on the configuration. One example of a tension based system would be where the tube 20 is attached to a tension-based transducer mechanism and pulled axially. For example, for the dogbone geometry (such as in FIG. 8), the inside surfaces of the sections 32 may be pulled in opposite axial directions to place the grating 12 in tension. A tension based configuration is also described in the commonly-owned copending U.S. patent application Ser. No. 08/925,598, entitled "High Sensitivity Fiber Optic Pressure Sensor for Use in Harsh Environments," to Robert J. Maron, discussed hereinbefore in the Background Art section hereto and incorporated herein by reference. In that case, the grating is pre-strained in tension and the tension decreases with increasing pressure. Other tension-based configurations which use the tube-encased grating described herein may be used. Alternatively, for configurations where the axial forces are less than the radial forces by a predetermined amount (based on the material properties), the tube 20 may be operated in tension (such as when the axial ends of the tube 20 are outside the pressure field; see the discussion of FIGS. 5, 6, and 16).

Also, if the elastic element (e.g., bellows or diaphragm) discussed herein have very low stiffness relative to the tube 20, only a small amount of force will be dropped across (or lost to) the elastic element. In that case, the sensor may be used as a force transducer.

Further, for any of the embodiments shown herein, instead of the fiber 10 passing through the sensor housing or the tube 20, the fiber 10 may be single-ended, i.e., only one end of the fiber 10 exits the housing or the tube 20. In that case, one end of the fiber 10 would be at the exit point of the fiber 10 from the tube 20 or prior to the exit point. Alternatively, the fiber 10 may exit from both sides of the tube 20 but one end of the fiber 10 would terminate before exiting the housing.

Also, it should be understood that the gratings of the invention may be used in reflection and/or transmission depending on whether the reflected or transmitted light from the grating is used to measure the measurand. Also, the term "tube" as used herein may also mean a block of material having the properties described herein.

The chambers or regions 34, 64, 74, 100, 116, 202, 306, 406 described herein may be filled with ambient air, or they may be evacuated (or be at another pressure), or they may be partially or completely filled with a fluid (liquid or gas), e.g., an oil. The type of filling fluid will depend on the desired thermal time constant, viscosity, and other fluid properties based on the desired application.

Also, it should be understood that, in operation, an instrumentation box (not shown), connected to the optical fiber 10, having a broadband source, a scanned laser light source, or other suitable known optical source, and having a suitable spectrum analyzer or other known opto-electronic measuring equipment, all well known in the art, may be used to provide the incident light 14. It may also be used to decode and measure the resultant wavelength or other optical parameter shift of the returned light (reflected 16 and/or transmitted 18) from the sensor(s) described herein, such as is described in U.S. Pat. Nos. 5,401,956, 5,426,297, or 5,513,913, or using other known optical instrumentation techniques.

Figure 31:
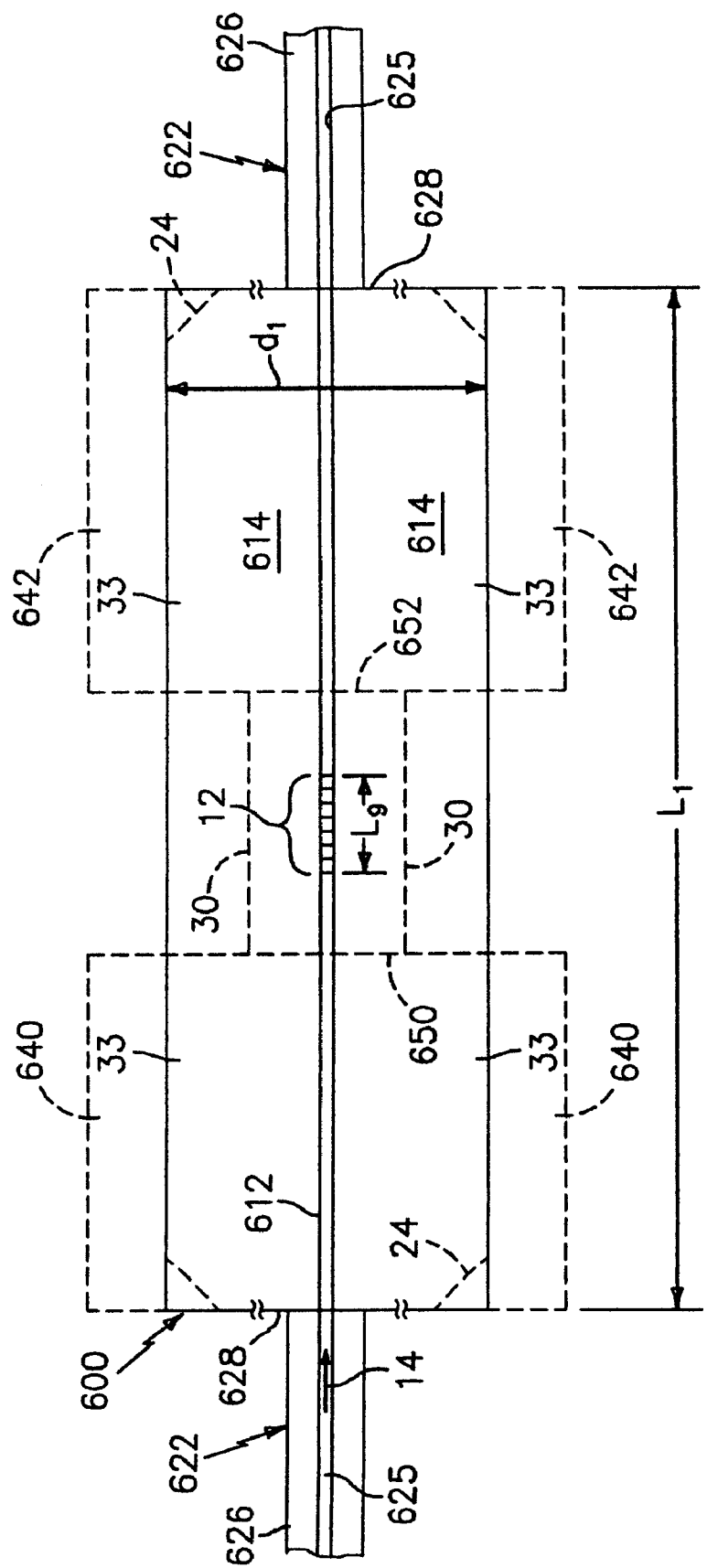
FIG. 31 is a side view of a large diameter optical waveguide having a grating disposed therein, in accordance with the present invention.

Referring to FIG. 31, alternatively, a portion of or all of the tube-encased fiber grating 20 may be replaced by a large diameter silica waveguide grating 600, such as that described in copending U.S. patent application Ser. No. 09/455,868, entitled "Large Diameter Optical Waveguide, Grating and Laser", which is incorporated herein by reference. The waveguide 600 has a core 612 (equivalent to the core of the fiber 10) and a cladding 614 (equivalent to the fused combination of the tube 20 and the cladding of the fiber 10) and having the grating 12 embedded therein. The overall length L1 of the waveguide 600 and the waveguide diameter d1 are set the same as that described hereinbefore for the tube 20 (i.e., such that the tube 20 will not buckle over the desired grating wavelength tuning range) and the outer diameter of the waveguide is at least 0.3 mm. An optical fiber 622 (equivalent to the fiber 10 in FIG. 1) having a cladding 626 and a core 625 which propagates the light signal 14, is spliced or otherwise optically coupled to one or both axial ends 628 of the waveguide 600 using any known or yet to be developed techniques for splicing fibers or coupling light from an optical fiber into a larger waveguide, that provides acceptable optical losses for the application.

The large diameter waveguide with grating 600 may be used in the same ways as the tube encased grating 20 is used herein where the fiber 10 is analogous to (and interchangeable with) the core 612 of the waveguide 600. For example, the waveguide 600 may be etched, ground or polished to achieve the "dogbone" shape described hereinbefore with the tube 20. Alternatively, the "dogbone" shape may be obtained by heating and fusing two outer tubes 640, 642 onto opposite ends of the waveguide 600, like discussed hereinbefore with FIG. 2. All other alternative embodiments described herein for the tube 20 and the tube-encased grating are also applicable to the waveguide 600 where feasible, including having a fiber laser or a DFB fiber laser, multiple fibers (or cores), various geometries, etc.

The tube-encased fiber grating 20 and the large diameter waveguide grating 600 may each also be referred to herein as a "optical sensing element". The tube-encased grating 20 and the large diameter waveguide grating 600 have substantially the same composition and properties in the locations where the tube 20 is fused to the fiber 10, because the end (or transverse) cross-section of the tube-encased grating 20 and the large diameter waveguide grating 600 are contiguous (or monolithic) and made of substantially the same material across the cross-section, e.g., a glass material, such as doped and undoped silica. Also, in these locations both have an optical core and a large cladding.

Also, the waveguide 600 and the tube-encased grating 20 may be used together to form any given embodiment of the sensing element described herein. In particular, one or more axial portion(s) of the sensing element may be a tube-encased grating or fiber and/or one or more other axial portion(s) may be the waveguide 600 which are axially spliced or fused or otherwise mechanically and optically coupled together such that the core of said waveguide is aligned with the core of the fiber fused to the tube. For example, a central region of the sensing element may be the large waveguide and one or both axial ends may be the tube-encased fiber which are fused together as indicated by dashed lines 650, 652, or visa versa (FIGS. 1, 11, 30, 31).

It should be understood that the dimensions, geometries, and materials described for any of the embodiments herein, are merely for illustrative purposes, and as such, any other dimensions, geometries, or materials may be used if desired, depending on the application, size, performance, manufacturing or design requirements, or other factors, in view of the teachings herein.

Further, it should be understood that, unless otherwise stated herein, any of the features, characteristics, alternatives or modifications described regarding a particular embodiment herein may also be applied, used, or incorporated with any other embodiment described herein. Also, the drawings shown herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A sensor, comprising:
    an optical waveguide having a core and a cladding, wherein the core comprises a pressure sensor; and
    a support affixed around the cladding, wherein the support comprises
        two first portions having a first diameter, and
        a second portion between the two first portions having a second diameter, wherein
            the second diameter is smaller than the first diameter, and wherein the pressure sensor is located at the second portion.

2. The sensor of claim 1, wherein the support is comprised of quartz.

3. The sensor of claim 1, wherein the pressure sensor comprises a Bragg grating.

4. The sensor of claim 1, wherein the support constitutes a unitary member.

5. The sensor of claim 1, further comprising a temperature sensor in the optical waveguide core located at one of the first portions.

6. The sensor of claim 5, wherein the temperature sensor comprises a Bragg grating.

7. The sensor of claim 1, wherein at least a part of the second portion comprises a first tube surrounding the optical waveguide.

8. The sensor of claim 7, wherein at least a part of the first portions comprises second tubes surrounding the first tube.

9. The sensor of claim 1, further comprising a cylinder surrounding the pressure sensor and attached to the two first portions.

10. The sensor of claim 9, wherein the pressure sensor comprises a Bragg grating.

11. The sensor of claim 9, wherein the support is comprised of quartz.

12. The sensor of claim 9, wherein the support constitutes a unitary member.

13. The sensor of claim 9, further comprising a temperature sensor in the optical waveguide core located at one of the first portions.

14. The sensor of claim 13, wherein the temperature sensor comprises a Bragg grating.

15. The sensor of claim 9, wherein at least a part of the second portion comprises a first tube surrounding the optical waveguide.

16. The sensor of claim 15, wherein at least a part of the first portions comprises second tubes surrounding the first tube.

17. The sensor of claim 9, wherein the optical waveguide core constitutes a portion of a fiber optic cable.

18. The sensor of claim 9, further comprising a gap between the cylinder and the pressure sensor.

19. The sensor of claim 18, wherein the gap is hermetic.

20. The sensor of claim 9, wherein the cylinder is fused to the first portions.

21. The sensor of claim 9, wherein the cylinder is comprised of quartz.

22. A sensor formed in an optical waveguide having a core and a cladding, comprising:
    a pressure sensor formed in the core at a second axial location along the optical waveguide between two first axial locations having a first cladding diameter,
    wherein the diameter of the cladding at the second location constitutes a second diameter smaller than the first diameter.

23. The sensor of claim 22, wherein the pressure sensor comprises a Bragg grating.

24. The sensor of claim 22, further comprising a temperature sensor in the optical waveguide core located at a portion of the core surrounded by cladding of the first diameter.

25. The sensor of claim 24, wherein the temperature sensor comprises a Bragg grating.

26. The sensor of claim 22, wherein the first diameter is at least 0.3 mm.

27. The sensor of claim 22, further comprising a cylinder surrounding the pressure sensor and attached to the cladding at the first axial locations.

28. The sensor of claim 27, wherein the pressure sensor comprises a Bragg grating.

29. The sensor of claim 27, further comprising forming a temperature sensor in the optical waveguide core located at a portion of the core surrounded by cladding of the first diameter.

30. The sensor of claim 29, wherein the temperature sensor comprises a Bragg grating.

31. The sensor of claim 27, further comprising a gap between the cylinder and the pressure sensor.

32. The sensor of claim 31, wherein the gap is hermetic.

33. The sensor of claim 27, wherein the cylinder is fused to the cladding.

34. The sensor of claim 27, wherein the cylinder is comprised of quartz.

35. The sensor of claim 27, wherein the first diameter is at least 0.3 mm.

36. The sensor of claim 18, further comprising a port for porting a pressure to the gap.

37. The sensor of claim 31, further comprising a port for porting a pressure to the gap.

* * * * *